US008326908B2

(12) United States Patent
Maruo et al.

(10) Patent No.: US 8,326,908 B2
(45) Date of Patent: Dec. 4, 2012

(54) RESIDUE NUMBER SYSTEM ARITHMETIC OPERATING SYSTEM, SCALING OPERATOR, SCALING OPERATION METHOD AND PROGRAM AND RECORDING MEDIUM OF THE SAME

(75) Inventors: Kazuyuki Maruo, Tokyo (JP); Takahiro Yamaguchi, Tokyo (JP)

(73) Assignee: Advantest Corporation, Tokyo (JP)

( * ) Notice: Subject to any disclaimer, the term of this patent is extended or adjusted under 35 U.S.C. 154(b) by 1226 days.

(21) Appl. No.: 11/340,870

(22) Filed: Jan. 27, 2006

(65) Prior Publication Data

US 2006/0184600 A1 Aug. 17, 2006

Related U.S. Application Data

(63) Continuation of application No. PCT/JP2004/010510, filed on Jul. 23, 2004.

(30) Foreign Application Priority Data

Jul. 31, 2003 (JP) ................................. 2003-284534

(51) Int. Cl.
*G06F 7/38* (2006.01)
(52) U.S. Cl. ...................................................... 708/491
(58) Field of Classification Search ........... 708/491–492
See application file for complete search history.

(56) References Cited

U.S. PATENT DOCUMENTS

| 4,994,994 | A | * | 2/1991 | Burgess et al. | ............... | 708/491 |
| 5,008,849 | A | * | 4/1991 | Burgess et al. | ............... | 708/491 |
| 6,898,613 | B1 | * | 5/2005 | Robinson et al. | ............. | 708/491 |

FOREIGN PATENT DOCUMENTS

JP 20001-202232 7/2001

OTHER PUBLICATIONS

A.P. Shenoy et al., "An Accurate Scaling Technique in Improved Residue Number System Arithmetic", Acoustics, Speech, and Signal Processing, IEEE International Conference on ICASSP' 87., vol. 12, Apr. 1987, pp. 1414 to 1417.
M. Anantha et al., "A Fast and Accurate RNS Scaling Technique for High Speed Signal Processing". IEEE Transactions on Acoustics, Speech, and Signal Processing, vol. 37, Issue 6, Jun. 1989, pp. 929 to 937.
PCT Request.
Notification Concerning Submission or Transmittal of Priority Document.
International Search Report.

* cited by examiner

*Primary Examiner* — Tan V. Mai
(74) *Attorney, Agent, or Firm* — Ryuka

(57) ABSTRACT

There is provided a scaling operator for calculating a quotient in a first residue format obtained by dividing an input number in the first residue format by a second modulus in a residue number system for representing numbers by the first residue format of a set of residues obtained with respect to first modulus and residues obtained with respect to second modulus, having a subtracter for outputting inter-moduli values of difference which are values of difference between the residues obtained with respect to the first modulus and the residues obtained with respect to the second modulus and a quotient outputting section for outputting a set of residues of the quotient obtained with respect to the first modulus and residues of the quotient obtained with respect to the second modulus as the quotient based on the inter-moduli values of difference.

16 Claims, 10 Drawing Sheets

RESIDUE NUMBER SYSTEM ARITHMETIC OPERATING SYSTEM, SCALING OPERATOR, SCALING OPERATION METHOD AND PROGRAM AND RECORDING MEDIUM OF THE SAME

CROSS REFERENCE TO RELATED APPLICATION

This is a continuation application of PCT/JP2004/010510 filed on Jul. 23, 2004 which claims priority from a Japanese Patent Application No. 2003-284534, filed on Jul. 31, 2003, the contents of which are incorporated herein by reference.

BACKGROUND OF THE INVENTION

1. Field of the Invention

The present invention relates to a residue number system (RNS) arithmetic operating system, a scaling operator, a scaling operation method and a program and a recording medium of the same. More specifically, the invention relates to the RNS arithmetic operating system, the scaling operator, the scaling operation method and the program and recording medium of the same for efficiently carrying out scaling operation of numbers represented by RNS.

2. Related Art

Conventionally, numerical arithmetic operation by means digital circuits has been realized by logical circuits based on binary number. There has been also proposed a numerical arithmetic operation method based on Residue Number System (RNS) lately as disclosed in B. Parhami, Computer Arithmetic, Oxford University Press, 2000, pp. 54-72. It has been known that additions, subtractions and multiplications may be carried at high speed by the RNS more than arithmetic operations by means of the conventional binary number, by reasons described below.

In additions in binary number, a carry signal is generated from arithmetic operation of each bit and propagates from the LSB side to the MSB side. Therefore, it is unable to determine a calculation result of i-th digit until when the carry signal of the i-th bit reaches to that digit.

Accordingly, a value of delay increases in proportional to a number of bits of operand to be operated. Meanwhile, the arithmetic operation in the RNS may be carried out at high speed because calculation may be carried out independently and in parallel in each residue digit and its operation speed is not dependent on a number of bits to be computed.

The RNS represents one number X by a set of N residue numbers (residues).

$$X = (x_0, x_1, x_2, \ldots, x_{N-1}) \tag{1-1}$$

In Equation (1-1), $x_i = X \bmod m_i$ (also represented as $x_i = |X|_{m_i}$), which is a residue obtained by dividing X by i-th modulus $m_i$. Further, $x_i$ is called as a residue digit or as a residue obtained with respect to the modulus $m_i$. Here, mod is an abbreviation of modulo and means that the following Equation (1-2) holds.

$$X = pm_i + x_i \tag{1-2}$$

Here, p is a quotient obtained by dividing X by $m_i$. At this time, X is congruent with $x_i$ with respect to the modulus $m_i$ and may be represented by the following Equation by using a congruence expression.

$$X \equiv x_i \bmod m_i \tag{1-3}$$

When N moduli $m_i$ (i=0, 1, 2, ..., N−1) are relatively prime, all numbers X in the following range may be represented by a unique set of N residue numbers. At this time, $\{m_1, m_2, \ldots, M_{N-1}\}$ is called as a modulus set.

$$0 \le X < \prod_{i=0}^{N-1} m_i = M \tag{1-4}$$

When a residue representation using the modulus set $\{m_1, m_2, \ldots, m_{N-1}\} = (8, 7, 5, 3)$ is considered for example, this RNS can represent integers of M=8×7×5×3=840. For example, $(0, 0, 0, 0)_{RNS}$ is 0 or 840 or 1680, $(1, 1, 1, 1)_{RNS}$ is 1 or 841 or 1681, $(0, 1, 3, 2)_{RNS}$ is 8 or 848 or 1688 and $(0, 1, 4, 1)_{RNS}$ is 64 or 904 or 1744. Then, in case of the modulus set (8, 7, 5, 3), a number of bits necessary for representing each residue digit is
=11 bits.

Additions, subtractions and multiplications may be realized by independently operating each residue digit in the RNS, so that no information needs to be propagated among the residue digits. That is, the following theorem holds.

(Theorem of RNS Additions, Subtractions and Multiplications)

When an operator "O" is an operator for representing additions, subtractions or multiplications, moduli of RNS are $\{m_1, m_2, \ldots, m_{N-1}\}$ and operands are A $(a_1, a_2, \ldots, a_{N-1})$ and B $((b_1, b_2, \ldots, b_{N-1})$, Z=AOB may be realized by operating the residue digits of the operands to each modulus.

$$|Y|_{m_i} = y_i = |a_i \cdot b_i|_{m_i} \tag{1-5}$$

Here, the left side is the residue of Y obtained with respect to $m_i$. The arithmetic operation of Equation (1-5) is also called as residue addition, residue subtraction or residue multiplication. The theorem of RNS additions, subtractions and multiplications may be proved as follows.

(Proof of Theorem of RNS Additions, Subtractions and Multiplications)

The following equation (1-6) holds from the definition of numerical representation of the RNS.

$$A = p_i m_i + a_i, \quad B = q_i m_i + b_i \tag{1-6}$$

Here, $p_i$ is a quotient obtained by dividing A by the modulus $m_i$ and $q_i$ is a quotient obtained by dividing B by the modulus $m_i$.

The following Equation (1-7) holds in the additions and subtractions.

$$\begin{aligned}
|Y|_{m_i} &= |A \pm B|_{m_i} \\
&= |p_i m_i + a_i \pm q_i m_i + b_i|_{m_i} \\
&= |(p_i + q_i) m_i + a_i \pm b_i|_{m_i}
\end{aligned} \tag{1-7}$$

Here, the following Equation (1-8) holds from $(p_i+q_i)m_i \equiv 0$.

$$|Y|_{m_i} = |a_i \pm b_i|_{m_i} \tag{1-8}$$

Meanwhile, the following Equation (1-9) holds in multiplications.

$$\begin{aligned}
|Y|_{m_i} &= |AB|_{m_i} \\
&= |(p_i m_i + a_i)(q_i m_i + b_i)|_{m_i} \\
&= |(p_i q_i m_i + p_i b_i + q_i a_i) m_i + a_i b_i|_{m_i}
\end{aligned} \tag{1-9}$$

Here, the following Equation (1-10) holds from $(p_i q_i m_i + q_i a_i) m_i \equiv 0$.

$$|Y|_{m_i} = |a_i b_i|_{m_i} \qquad (1\text{-}10)$$

It will be seen from the above Equations (1-8) and (1-10) that each residue digit of Y may be calculated by carrying out arithmetic operation of each residue digit of A and B. Accordingly, it is proved that the theorem of Equation (1-5) holds.

From the theorem of RNS additions, subtractions and multiplications, it becomes possible to realize additions, subtractions and multiplications in the RNS by providing a residue arithmetic logic unit (residue ALU) for carrying out the arithmetic operation with respect to the pertinent residue digit per residue digit corresponding to the two inputted operands A and B and to the operation result Y to be outputted. It also allows calculation of a certain residue digit to be carried out independently from calculation of the other residue digits. The arithmetic operation by means of the residue ALU corresponding to each residue digit may be carried out at higher speed because the delay caused by the carry-propagation is limited to that of a number of bits of the residue digit.

In order to increase the speed of the numerical arithmetic operation using the RNS, it is necessary to convert systems from the binary or decimal system to the RNS (Binary-to-Residue B/R converter) and to convert from the RNS to the binary or decimal system (Residue-to-Binary (R/B) converter). While the B/R converter may be realized relatively easily, several methods for realizing the R/B converter are being discussed.

For the R/B converter, one using Chinese Remainder Theorem is used in general. A case of converting $Y=(y_0, y_1, y_2, Y_3)=(5, 3, 4, 2)$ into the decimal system when a modulus set $\{m_0, m_1, m_2, m_3\}=\{8, 7, 5, 3\}$ will be exemplified below.

(5, 3, 4, 2) may be reduced as shown in the following Equation (1-11) from the theorem of RNS additions, subtractions and multiplications shown in Equation (1-5) and then Equation (1-12) may be obtained.

$$(5,0,0,0)+(0,3,0,0)+(0,0,4,0)+(0,0,0,2) \qquad (1\text{-}11)$$

$$5\times(1,0,0,0)+3\times(0,1,0,0)+4\times(0,0,1,0)+2\times(0,0,0,1) \qquad (1\text{-}12)$$

An arbitrary residue representation $(y_0, y_1, y_2, Y_3)$ may be converted into the decimal representation by using the following Equation (1-13) by thus finding the decimal representation corresponding to (1,0,0,0), (0,1,0,0), (0,0,1,0) and (0,0,0,1) in advance.

$$y_0 \times(1,0,0,0)+y_1\times(0,1,0,0)+y_2\times(0,0,1,0)+y_3\times(0,0,0,1) \qquad (1\text{-}13)$$

Here, (1, 0, 0, 0) is a number whose residue obtained with respect to modulus $8(=m_0)$ is 1 mid whose residue obtained with respect to a modulus subset $\{7, 5, 3\}=\{, m_1, m_2, m_3\}$ is 0. The latter condition may be met by calculating (1, 0, 0, 0) under the condition that it is a least common multiple of $m_1$, $m_2$, $m_3$. These conditions may be represented by the following Equation (1-14).

$$a)\ (1,0,0,0) \bmod m_0 = 1,$$

$$b)\ (1,0,0,0) = \beta_0 \cdot m_1 \cdot m_2 \cdot m_3 \qquad (1\text{-}14)$$

Here, $\beta 0$ is a natural number. Then, if $m_1$, $m_2$, $m_3$ are relatively prime, the conditions of a) and b) may be rewritten to the following equation (1-15) from Equation (1-4).

$$\beta_0 \cdot (M/m_0) \bmod m_0 = 1 \qquad (1\text{-}15)$$

The decimal notation of (1, 0, 0, 0) is given by finding the above natural number $\beta 0$. The following Equation (1-16) shows the decimal notation of (1, 0, 0, 0), (0, 1, 0, 0), (0, 0, 1, 0) and (0, 0, 0, 1) obtained with respect to the RNS of $\{8, 7, 5, 3\}$.

$$m_0=8 : M/m_0=105,\ \beta_0=1(1\equiv 105 \bmod 8)\therefore (1,0,0,0)=105$$

$$m_1=7 : M/m_1=120,\ \beta_1=1(1\equiv 120 \bmod 7)\therefore (0,1,0,0)=120$$

$$m_2=5 : M/m_2=168,\ \beta_2=2(1\equiv 168\times 2 \bmod 5)\therefore (0,0,1,0)=336$$

$$m_3=3 : M/m_3=280,\ \beta_3=1(1\equiv 280 \bmod 3)\therefore (0,0,0,1)=280. \qquad (1\text{-}16)$$

Equation (1-16) converts the numbers (5, 3, 4, 2) represented by the RNS of $\{8, 7, 5, 3\}$ into the decimal system of $5\times 105+3\times 120+4\times 336+2\times 280=2117$. However, because the number represented by this RNS is $0 \leq Y < M=840$, $Y=|2117|_M=437$.

The Chinese remainder theorem is led by the following Equation in general.

$$\begin{aligned}(y_0, y_1, \ldots, y_{N-1}) &= y_0(1, 0, 0, \ldots, 0) + \\ &\quad y_1(0, 1, 0, \ldots, 0) + \ldots + \\ &\quad y_{N-1}(0, 0, 0, \ldots, 1) \\ &= \left| y_0\left(\beta_0 \cdot \frac{M}{m_0}\right) + y_i\left(\beta_1 \cdot \frac{M}{m_1}\right) + \ldots + \right.\\ &\quad \left. y_{N-1}\left(\beta_{N-1} \cdot \frac{M}{m_{N-1}}\right) \right|_M \\ &= \left| \sum_{i=0}^{N-1} \left(y_i \cdot \beta_i \cdot \frac{M}{m_1}\right) \right|_M \end{aligned} \qquad (1\text{-}17)$$

The use of the RNS allows additions, subtractions and multiplications to be calculated at high speed. However, it has had a problem that due to scaling operation described below, its speed is not faster than the speed of calculation of additions, subtractions and multiplications carried out by means of binary system.

When multiplication of n bits×n bits is carried out by means of binary system, its multiplication result is (2n) bits. If multiplication is to be carried out only once like (514)× (237) for example, it will do by just outputting a multiplication result of (2n) bits as it is for the n bits inputted.

However, an output number of bits increases if multiplication is repeated like (514)×(237)× . . . ×(353) for example. When decimal numbers of $(^{15}/_{16})\times(^{15}/_{16})$ is calculated for example, it results in $(^{225}/_{256})$. However, when output bits is only four, a part of the calculation result is truncated, outputting the same n bits with the number of bits inputted as the calculation result. It is equivalent to a process of shifting to right by n bits. In this example, $(^{15}/_{16})\times(^{15}/_{16})=(^{225}/_{256})$ is shifted by 4 bits to output $(^{14}/_{16})$ as the multiplication result. This carry-matching process is called as Scaling and is used in carry-matching mantissa part in floating-point multiplication for example.

This scaling process may be applied to binary number just by carrying out the bit-shift process or just by masking unnecessary bits because weighting has been implemented corresponding to each digit of binary number. That is, it requires only shifting time corresponding to n bits. However, it is unable to realize the scaling to numbers represented by the RNS by the bit shift operation. For example, when multiplication of (5, 3, 4, 2)×(3, 2, 4, 2) (=437×779 dec) is carried out in the RNS of $\{8, 7, 5, 3\}$ for example, it results in 340,423 dec. This RNS can represent only a number up to 839 in maximum. Accordingly, it is necessary to scale by M=840 in the RNS of {8, 7, 5, 3} so that the multiplication result becomes 405. However, (5, 3, 4, 2)×(3, 2, 4, 2)=(7, 6, 1, 1)$_{RNS\{8,7,5,3\}}$ and it is unable to scale to 405=(5, 6, 0, 0) as it is.

It is conceivable of utilizing the Chinese remainder theorem in order to carry out scaling in the RNS. That is, the multiplication result (7, 6, 1, 1) is converted into a binary number of (1010011000111000111) and this result is scaled by the means of the bit-shift described above to obtain (101001100). Then, it is converted again into the RNS to obtain (5, 6, 0, 0). However, it takes time for the calculation because the Chinese remainder theorem is involved in multiplication of each residue digit $y_i$ and the constant $b_i\cdot(M/m_i)$ as shown in Equation (1-17). The merit of multiplication in the RNS (increase of calculation speed) is lost if the Chinese remainder theorem is used to convert the RNS into the binary system and to scale per multiplication in carrying out a number calculating process that frequently uses multiplications.

SUMMARY OF THE INVENTION

Accordingly, it is an object of the invention to provide an RNS arithmetic operating system, a scaling operator, a scaling operation method and a program and a recording medium of the same capable of solving the abovementioned problems. This object may be achieved through the combination of features described in independent claims of the invention. Dependent claims thereof specify preferable embodiments of the invention.

According to a first aspect of the invention, there is provided a scaling operator for calculating a quotient in a first residue format obtained by dividing an input number in the first residue format by a second modulus in a residue number system for representing numbers by the first residue format of a set of residues obtained with respect to first modulus and residues obtained with respect to second modulus, having a subtracter for outputting inter-moduli values of difference which are values of difference between the residues obtained with respect to the first modulus and the residues obtained with respect to the second modulus and a quotient outputting section for outputting a set of residues of the quotient obtained with respect to the first modulus and residues of the quotient obtained with respect to the second modulus as the quotient based on the inter-moduli values of difference.

The first modulus and the second modulus may be relatively prime. The difference between the first modulus and the second modulus is 1 and the quotient outputting section may output residues of the inter-moduli value of difference obtained with respect to the first modulus as residues of the quotient obtained with respect to the first modulus and residues of the quotient obtained with respect to the second modulus.

The scaling operator may also have an overflow detector for detecting an overflow of the input number when a number obtained by dividing a product of the first modulus and the second modulus by an absolute value of the difference between the first modulus and the second modulus exceeds the input number.

The subtracter may output the inter-moduli value of difference obtained by subtracting a residue obtained with respect to a larger modulus from a residue obtained with respect to a smaller modulus among the first and second modulus in the input number in the residue format and the quotient outputting section may calculate a residue, obtained with respect to the first modulus, of a value obtained by dividing the inter-moduli value of difference by the absolute value of difference between the first modulus and the second modulus as a residue of the quotient obtained with respect to the first modulus and a residue of the quotient obtained with respect to the second modulus.

The first modulus is a product of a plurality of first sub-moduli which are plural integers relatively prime, the second modulus is a product of a plurality of second sub-moduli which are plural integers relatively prime, and the scaling operator may further include a residue format converter for converting the input number in a second residue format in which residues of the input number obtained with respect to the first modulus are represented by a plurality of first sub-residues obtained by dividing the input number by each one of the plurality of tint sub-moduli and residues of the input number obtained with respect to the second modulus are represented by a plurality of second sub-residues obtained by dividing the input number by each one of the plurality of second sub-moduli into the input number in the first residue format and a residue format inverse converter for converting the quotient in the first residue format outputted out of the quotient outputting section into the quotient in the second residue format.

The first modulus is a product of a plurality of first sub-moduli which are plural integers relatively prime, the second modulus is a product of a plurality of second sub-moduli which are plural integers relatively prime, the input number may be also represented in the second residue format in which residues obtained with respect to the first modulus are represented by a plurality of first sub-residues obtained by dividing the input number by each one of the plurality of first sub-moduli and residues obtained with respect to the second modulus are represented by a plurality of second sub-residues obtained by dividing the input number by each one of the plurality of second sub-moduli, the scaling operator may further have a first sub-residue converting section for converting the residues of the input number obtained with respect to the first modulus and represented by the plurality of first sub-residues into a plurality of first converted sub-residues which are residues obtained with respect to each one of the plurality of second sub-moduli, the subtracter may have a subtracter-corresponding-to-second modulus for outputting the first inter-moduli values of difference which are values of difference between the plurality of first converted sub-residues representing the residues of the input number obtained with respect to the first modulus and the plurality of second sub-residues representing the residues of the input number obtained with respect to the second modulus and represented by a plurality of residues obtained by dividing the values of difference by each one of the plurality of second sub-moduli, and the quotient outputting section may have a quotient outputting section-corresponding-to-second modulus for outputting residues of the quotient obtained with respect to the second modulus and represented by a plurality of residues obtained with respect to each one of the plurality of second sub-moduli based on the first inter-moduli values of difference.

The scaling operator may further have a second sub-residue converting section for converting the residues of the input number obtained with respect to the second modulus and represented by the plurality of second sub-residues into a plurality of second converted sub-residues which are residues obtained with respect to each one of the plurality of first sub-moduli, the subtracter may also have a subtracter-corresponding-to-first modulus for outputting the second inter-moduli values of difference which are values of difference between the plurality of second converted sub-residues representing the residues of the input number obtained with respect to the second modulus and the plurality of first sub-residues representing the residues of the input number obtained with respect to the first modulus and represented by a plurality of residues obtained by dividing the values of difference by each one of the plurality of first sub-moduli, and the quotient outputting section may have a quotient outputting section-corresponding-to-first modulus for outputting residues of the quotient obtained with respect to the first modulus and represented by a plurality of residues obtained with respect to each one of the plurality of first sub-moduli based on the second inter-moduli values of difference.

The scaling operator may further have a condition judging section for judging whether or not the residues of the input number obtained with respect to the first modulus and the residues of the input number obtained with respect to the second modulus satisfy a relationship of the order of their magnitudes in advance, wherein the quotient outputting section may also have a value-of-difference adjusting section for feeding the first inter-moduli values of difference and the second inter-moduli values of difference adjusted by adding a preset constant to one of the first inter-moduli values of difference and the second inter-moduli values of difference to the quotient outputting section-corresponding-to-first modulus and the quotient outputting section-corresponding-to-second modulus, respectively, when the residues of the input number obtained with respect to the first modulus and the residues of the input number obtained with respect to the second modulus satisfy the relationship of the order of their magnitudes in advance.

Still more, when the first modulus is larger than the second modulus by 1 and the condition judging section judges that the residues of the input number obtained with respect o the first modulus and the residues of the input number obtained with respect to the second modulus satisfy the relationship of the order of their magnitudes in advance when the residues of the input number obtained with respect to the first modulus is larger than the residues of the input number obtained with respect to the second modulus, the value-of-difference adjusting section may adjust the second inter-moduli values of difference by adding 1, the quotient outputting section-corresponding-to-first modulus may convert the second inter-moduli values of difference adjusted by the value-of-difference adjusting section into residues of the quotient obtained with respect to the first modulus represented by the plurality of residues obtained with respect to each one of the plurality of first sub-moduli and the quotient outputting section-corresponding-to-second modulus may convert the first inter-moduli values of difference into residues of the quotient obtained with respect to the second modulus represented by a plurality of residues obtained with respect to each one of the plurality of second sub-moduli.

Still more, the first sub-residue converting section may have a conversion factor calculating section for calculating a conversion factor that sequentially converts residue-under-conversions into 0 and keeps all of the other residue-under-conversions already converted into 0 as 0 when subtracted from the value-under-conversion for each of the residues-under-conversion obtained by dividing the value-under-conversion by each one of the plurality of residue-under-conversions in the value-under-conversion that has residues of the input number obtained with respect to the first modulus as its initial value and that is represented by the plurality of first sub-residues, a conversion factor adder for sequentially adding the conversion factor sequentially calculated by the conversion factor calculating section and represented by the residues obtained with respect to the first modulus, a value-under-conversion subtracter for sequentially subtracting the conversion factor sequentially calculated by the conversion factor calculating section and represented by the plurality of residues obtained with respect to each one of the plurality of first sub-moduli from the value-under-conversion, and a conversion result outputting section for outputting the plurality of residues obtained by adding the added value obtained by adding all of the conversion factors, by the conversion factor adder, calculated for all of the plurality of residue-under-conversions as the plurality of first converted sub-residues.

The conversion factor calculating section may have a memory for storing the conversion factor corresponding to the residue-under-conversion in an address corresponding to the residue-under-conversion for each of the plurality of residue-under-conversions.

The first modulus is a product of a plurality of first sub-moduli which are plural integers relatively prune, the second modulus is a product of a plurality of second sub-moduli which are plural integers relatively prime, the input number is also represented in a second residue format in which residues obtained with respect to the first modulus are represented by a plurality of first sub-residues obtained by dividing the input number by each one of the plurality of first sub-moduli and residues obtained with respect to the second modulus are represented by a plurality of second sub-residues obtained by dividing the input number by each one of the plurality of second sub-moduli, the scaling operator further comprises a first sub-residue converting section for converting residues of the input number obtained with respect to the first modulus and represented by the plurality of first sub-residues into a plurality of first converted sub-residues which are residues obtained with respect to each one of the plurality of second sub-moduli, the subtracter has a subtracter-corresponding-to-second modulus for outputting the first inter-moduli values of difference which are values of difference between the plurality of first converted sub-residues representing residues of the input number obtained with respect to the first modulus and the plurality of second sub-residues representing residues of the input number obtained with respect to the second modulus and represented by a plurality of residues obtained by dividing the values of difference by each one of the plurality of second sub-moduli, and the scaling operator further comprises a second sub-residue converting section for converting the first inter-moduli values of difference represented by a plurality of residues obtained with respect to each one of the plurality of second sub-moduli into converted inter-moduli values of difference represented by a plurality of residues obtained with sect to each one of the plurality of first sub-moduli, and the quotient outputting section has a quotient outputting section-corresponding-to-first modulus for outputting residues of the quotient obtained with respect to the first modulus and represented by a plurality of residues obtained with respect to each one of the plurality of first sub-moduli based on the converted inter-moduli values of difference, and a quotient outputting section-corresponding-to-second modulus for outputting residues of the quotient obtained with respect to the second modulus and represented by a plurality of residues obtained with respect to each one of the plurality of second sub-moduli based on the first inter-moduli values of difference.

The first modulus is a product of a plurality of first sub-moduli which are plural integers relatively prime, the second modulus is a product of a plurality of second sub-moduli which are plural integers relatively prime, the input number is also represented in a second residue format in which the residues obtained with respect to the first modulus are represented by a plurality of first sub-residues obtained by dividing the input number by each one of the plurality of first sub-moduli and the residues obtained with respect to the second modulus are represented by a plurality of second sub-residues obtained by dividing the input number by each one of the plurality of second sub-moduli, the scaling operator may further have a first sub-residue converting section for converting the residues of the input number obtained with respect to the first modulus and represented by the plurality of first sub-residues into a plurality of first converted sub-residues which are residues obtained with respect to each one of the plurality of second sub-moduli, the subtracter may have a subtracter-corresponding-to-second modulus for outputting the first inter-moduli values of difference which are values of difference between the plurality of first converted sub-residues representing the residues of the input number obtained with respect to the first modulus and the plurality of second sub-residues representing the residues of the input number obtained with respect to the second modulus and represented by a plurality of residues obtained by dividing the values of difference by each one of the plurality of second sub-moduli, and the quotient outputting section may have a quotient outputting section-corresponding-to-first modulus for outputting residues of the quotient obtained with respect to the first modulus and represented by a plurality of residues obtained with respect to each one of the plurality of first sub-moduli based on the converted inter-moduli values of difference and a quotient outputting section-corresponding-to-second modulus for outputting residues of the quotient obtained with respect to the second modulus and represented by a plurality of residues obtained with respect to each one of the plurality of second sub-moduli based on the first inter-moduli values of difference.

According to a second aspect of the invention, there is provided an RNS arithmetic operating system using a residue number system representing numbers by a first residue format or a set of residues obtained with respect to a first modulus and residues obtained with respect to a second modulus, having an RNS arithmetic operator that receives two numbers to be operated and carries out additions, subtractions or multiplications between the two numbers-under-operation and a scaling operator for receiving the operation result of the RNS arithmetic operator as an input number when the operation result needs to be scaled and for calculating a quotient obtained by dividing the input number by the second modulus as a scaling result of the operation result, wherein the scaling operator has a subtracter for outputting inter-moduli values of difference which are values of difference between residues obtained with respect to the first modulus and residues obtained with respect to the second modulus and a quotient outputting section for outputting a set of residues of the quotient obtained with respect to the first modulus and residues of the quotient obtained with respect to the second modulus as the quotient based on the inter-moduli values of difference.

According to a third aspect of the invention, there is provided a program, or a recording medium for recording the program, for operating a computer as a scaling operator for calculating a quotient in a first residue format obtained by dividing an input number in the first residue format by a second modulus in a residue number system representing numbers by the first residue format of a set of residues obtained with respect to the first modulus and residues obtained with respect to the second modulus, wherein the program operates the computer as a subtracter for outputting inter-moduli values of difference which are values of difference between the residues obtained with respect to the first modulus and the residues obtained with respect to the second modulus in the input number and as a quotient outputting section for outputting a set of residues of the quotient obtained with respect to the first modulus and residues of the quotient obtained with respect to the second modulus as the quotient.

According to a fourth aspect of the invention, there is provided a scaling operation method for calculating a quotient in a first residue format obtained by dividing an input number in the first residue format by a second modulus in a residue number system for representing numbers by the first residue format of a set of residues obtained with respect to first modulus and residues obtained with respect to second modulus, having a subtracting step of outputting inter-moduli values of difference which are values of difference between the residues obtained with respect to the first modulus and the residues obtained with respect to the second modulus, and a quotient outputting step of outputting a set of residues of the quotient obtained with respect to the first modulus and residues of the quotient obtained with respect to the second modulus as the quotient based on the inter-moduli values of difference.

The first modulus is a product of a plurality of first sub-moduli which are plural integers relatively prime, the second modulus is a product of a plurality of second sub-moduli which are plural integers relatively prime, the input number is also represented in a second residue format in which the residues obtained with respect to the first modulus are represented by a plurality of first sub-residues obtained by dividing the input number by each one of the plurality of first sub-moduli and the residues obtained with respect to the second modulus are represented by a plurality of second sub-residues obtained by dividing the input number by each one of the plurality of second sub-moduli, the scaling operation step may further include a first sub-residue converting step of converting the residues of the input number obtained with respect to the first modulus and represented by the plurality of first sub-residues into a plurality of first converted sub-residues which are residues obtained with respect to each one of the plurality of second sub-moduli, the subtracting step may have a subtracting step corresponding to the second modulus of outputting the first inter-moduli values of difference which are values of difference between the plurality of first converted sub-residues representing residues of the input number obtained with respect to the first modulus and the plurality of second sub-residues representing residues of the input number obtained with respect to the second modulus and represented by a plurality of residues obtained by dividing the values of difference by each one of the plurality of second sub-moduli, and the quotient outputting step may have a quotient outputting step corresponding to the second modulus of outputting residues of the quotient obtained with respect to the second modulus and represented by a plurality of residues obtained with respect to each one of the plurality of second sub-moduli based on the first inter-moduli values of difference.

It is noted that the summary of the invention described above does not necessarily describe all necessary features of the invention. The invention may also be a sub-combination of the features described above.

Accordingly, the invention can provide the residue arithmetic operating system capable of realizing both of the increase of speed of additions, subtractions and multiplications by means of the RNS and the increase of speed of the scaling operation.

DETAILED DESCRIPTION OF THE INVENTION

The invention will now be described based on preferred embodiments, which do not intend to limit the scope of the invention, but exemplify the invention. All of the features and the combinations thereof described in the embodiments are not necessarily essential to the invention.

An RNS arithmetic operating system of the present embodiment realizes additions, subtractions and multiplications and scaling operated at high speed by using two kinds of residue representations of Scaling RNS and Arithmetic RNS described below and by calculating the additions, subtractions and multiplications by the arithmetic RNS and the scaling by the scaling RNS.

(1) Scaling RNS

The scaling RNS is RNS aimed at scaling a number-under-scaling Y at high speed. Here, the scaling method using the scaling RNS will be called as "Scaling by the Difference in Scaling RNS; SDSRNS).

The scaling RNS is RNS to which moduli $\{m^\uparrow, m^\downarrow\}$ are given and which represents numbers by a first residue format of a set of residues obtained with respect to the first modulus $m^\uparrow$ and residues obtained with respect to the second modulus $m^\downarrow$. In the present embodiment, $m^\uparrow$ and $m^\downarrow$ are relatively prime, and the following explanation will be made mainly on a case when a difference between $m^\uparrow$ and $m^\downarrow$ is 1, or more concretely on a case when $m^\downarrow = m^\uparrow - 1$.

When $m^\downarrow = m^\uparrow - 1$ and if $Y = p \cdot m^\uparrow + y^\uparrow$ and $Y = p \cdot m^\downarrow + y^\downarrow$ as shown in Complementary Explanation 1 described later, a quotient q obtained by dividing Y by $m^\downarrow$, i.e., a scaling result $q = \{q \bmod m^\uparrow, q \bmod m^\downarrow\}$ obtained by scaling Y by $m^\downarrow$, is given by the following Equation (2-1).

$$q = (q \bmod m^\uparrow, q \bmod m^\downarrow) \quad (2\text{-}1)$$
$$= ((y^\downarrow - y^\uparrow) \bmod m^\uparrow, (y^\downarrow - y^\uparrow) \bmod m^\uparrow)$$

Figure 1:
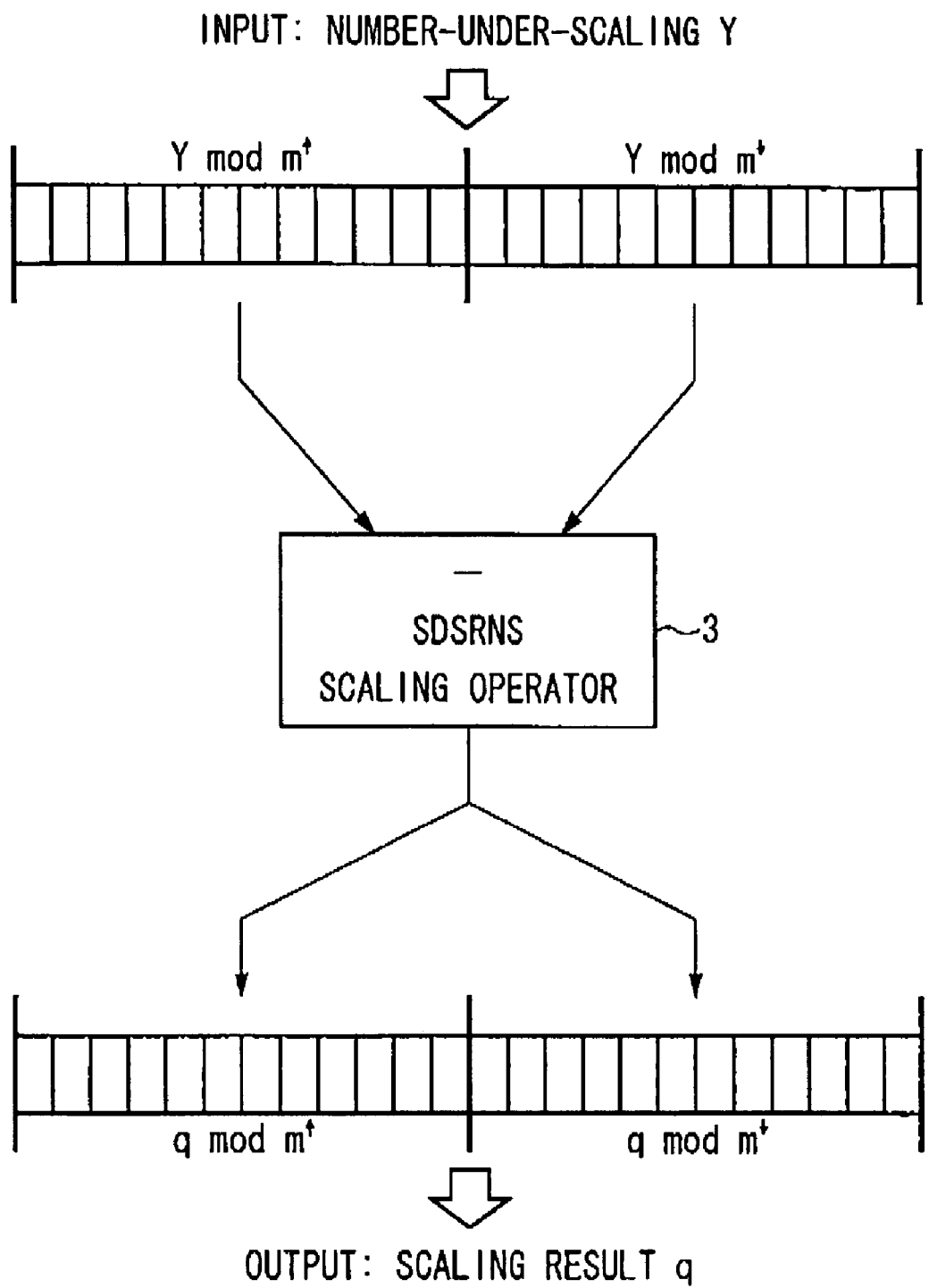
FIG. 1 shows an outline of a scaling process according to one embodiment of the invention.

FIG. 1 is a schematic drawing of a scaling process by the SDSRNS. A scaling operator 3 shown in the figure carries out the scaling process based on Equation (2-1) by using the SDSRNS. Thereby, the scaling operator 3 can carry out the scaling at high speed by using a result of subtraction between residue digits of the input value Y.

(2) Arithmetic RNS

The use of the SDSRNS makes it unnecessary to carry out the process requiring an arithmetic complexity proportional to a square of number of operation bit, such as multiplication using the Chinese Remainder Theorem required in scaling in the conventional RSN, as shown by the above Equation (2-1). Therefore, the scaling process may be carried out at high speed.

However, the SDSRNS has had a problem that because it represents a number-under-scaling by two moduli, each modulus becomes a large value and a carry-propagation delay becomes large in implementing arithmetic operations of additions, subtractions or multiplications. For example, with the maximum value M in representable numbers be $2^{24}$, $m^\uparrow$ and $m^\downarrow$ become the number close to $2^{12}$ and the modulus set is found to be $\{m^\uparrow, m^\downarrow\} = \{4097, 4096\}$. As a result, the number of bits used for calculation of each residue digit becomes 12 ($= \log_2 M$). Thus, the carry-propagation delay becomes large in proportional to $\log_2 M$ by the SDSRNS. The original merit of the RNS is that it allows the carry-propagation delay to be reduced by combining multiple moduli of around 4 to 5 bits wide and by independently calculating per each residue digit. Therefore as M increases, the merit of the RNS cannot be fully utilized due to the scaling RNS by which the carry-propagation delay becomes large.

Then, in addition to the scaling RNS for use in scaling, the arithmetic RNS for use in operations other than scaling is introduced to achieve the increase of speed of the both numerical operations and scaling. The arithmetic RNS will be defined below.

The arithmetic RNS adopts, as the modulus set, a plurality of moduli $\{m^\uparrow_0, m^\uparrow_1, m^\uparrow_2, \ldots, m^\uparrow_{j-1}\}$ obtained by prime-factoring the first modulus $m^\uparrow$ of the scaling RNS and a plurality of moduli $\{m^\downarrow_0, m^\downarrow_1, m^\downarrow_2, \ldots, m^\downarrow_{k-1}\}$ obtained by prime-factoring the second modulus $m^\downarrow$. That is, the arithmetic RNS is RNS having $\{\{(m^\uparrow_0, m^\uparrow_1, m_{\uparrow 2}, \ldots, m^\uparrow_{j-1}\}, \{m^\downarrow_0, m^\downarrow_1, m^\downarrow_2, \ldots, m^\downarrow_{k-1}\}\}$ as the modulus set.

Here, the set of the plurality of moduli $\{m^\uparrow_0, m^\uparrow_1, m_{\uparrow 2}, \ldots, m^\uparrow_{j-1}\}$ corresponding to the first modulus $m^\uparrow$ will be called as a modulus subset or a plurality of first sub-moduli $\{m^\uparrow_0, m^\uparrow_1, m^\uparrow_2, \ldots, m^\uparrow_{j-1}\}$ corresponding to the first modulus $m^\uparrow$ and the set of the plurality of second moduli $\{m^\downarrow_0, m^\downarrow_1, m^\downarrow_2, \ldots, m^\downarrow_{k-1}\}$ will be called as a modulus subset or a second sub-moduli $\{m^\downarrow_0, m^\downarrow_1, m^\downarrow_2, \ldots, m^\downarrow_{k-1}\}$ corresponding to the second modulus $m^\downarrow$.

At this time, the first modulus $m^\uparrow$ is a product of the plurality of first sub-moduli $\{m^\uparrow_0, m^\uparrow_1, m_{\uparrow 2}, \ldots, m^\uparrow_{j-1}\}$ which is a plurality of integers that are relatively prime and the second modulus $m^\downarrow$ is a product of the plurality of second sub-moduli $\{m^\downarrow_0, m^\downarrow_1, m^\downarrow_2, \ldots, m^\downarrow_{j-1}\}$ which is a plurality of integers that are relatively prime as shown in the following Equation (2-2).

$$m^\uparrow = \prod_{i=0}^{j-1} m^\uparrow_i, \quad m^\downarrow = \prod_{i=0}^{k-1} m^\downarrow_i, \quad (2\text{-}2)$$

$m^\uparrow_0, m^\uparrow_1, m^\uparrow_2, \ldots, m^\uparrow_{j-1}$ are prime with one another $m^\downarrow_0, m^\downarrow_1, m^\downarrow_2, \ldots, m^\downarrow_{k-1}$ are prime with one another Here, in order to simplify the notation, we write $|X|_{ScalingRNS}$ and specify the scaling RNS representation of a number. We write $|X|_{arithmeticRNS}$ and specify the arithmetic RNS representation of a number as shown in the following Equation (2-3).

$$|X|_{ScalingRNS}=(x^\uparrow, x^\downarrow),$$

$$|X|_{ArithmeticRNS}=((x^\uparrow_0, x^\uparrow_1, x^\uparrow_2, \ldots, x^\uparrow_{j-1}), (x^\downarrow_0, x^\downarrow_1, x^\downarrow_2, \ldots, x^\downarrow_{k-1})). \quad (2\text{-}3)$$

From the Equation (2-3), it can be regarded that the arithmetic RNS adopts a second residue format in which a residue $x^\uparrow$ of X with respect to the first modulus $m^\uparrow$ is represented by a plurality of sub-residues $(x^\uparrow_0, x^\uparrow_1, \ldots, x^\uparrow_{j-1})$ obtained by dividing X by each of the plurality of sub-moduli $\{m^\uparrow_0, m^\uparrow_1, m^\uparrow_2, \ldots, m^\uparrow_{j-1}\}$ and a residue $x^\downarrow$ of X with respect to the second modulus $m^\downarrow$ is represented by a plurality of sub-residues $(x^\downarrow_0 x^\downarrow_1, \ldots, x^\downarrow_{j-1})$ obtained by dividing X by each of the plurality of second sub-moduli $\{m^\downarrow_0, m^\downarrow_1, m^\downarrow_2, \ldots, m^\downarrow_{j-1}\}$.

An RNS arithmetic operating system 5 of the present embodiment performs additions, subtractions and multiplications by an RNS arithmetic operator 10 by receiving numbers $|A|_{ArithmeticRNS}$ and $|B|_{ArithmeticRNS}$ represented by the arithmetic RNS. When scaling becomes necessary as a result of calculation by the RNS arithmetic operator 10, the RNS arithmetic operating system 5 converts the calculation result $|Y|_{ArithmeticRNS}$ from the arithmetic residue format to the scaling residue format to obtain $|Y|_{ScalingRNS}$. Next, the RNS arithmetic operating system 5 carries out scaling by the SDSRNS, described in connection with the scaling RNS, to obtain $|Y/m^\downarrow|_{ScalingRNS}$. Then, the RNS arithmetic operating system 5 converts it from the scaling residue format to the arithmetic residue format to obtain $|Y/m^\downarrow|_{ArithmeticRNS}$. Thereby, the RNS arithmetic operating system 5 can achieve the increase of speed in performing not only additions, subtractions and multiplications but also scaling. That is, because the RNS arithmetic operating system 5 carries out the additions, subtractions and multiplications by the arithmetic RNS by which each residue digit is represented by four bits for example and whose bit width is small as compared to that of the scaling RNS, it allows the carry-propagation delay to be kept sufficiently small. Then, since the SDSRNS can perform the scaling only by subtractions, it can calculate more quickly than the conventional scaling method, which has to utilize the Chinese Remainder Theorem.

Figure 2:
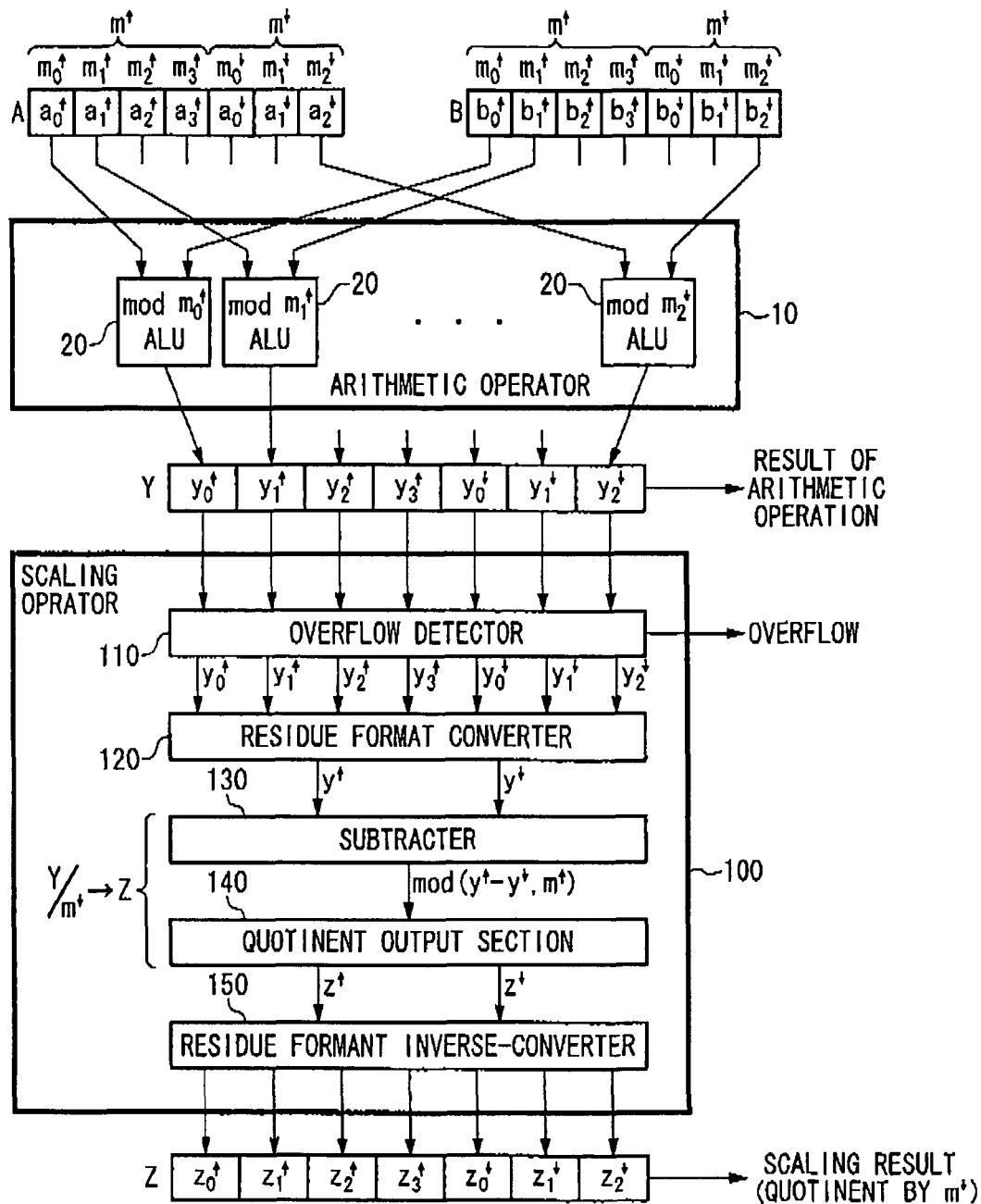
FIG. 2 shows a configuration of an RNS arithmetic operating system according to the embodiment of the invention.

FIG. 2 shows a configuration of the RNS arithmetic operating system 5 of the present embodiment. The RNS arithmetic operating system 5 has the RNS arithmetic operator 10 for carrying out various operations by receiving RNS numbers A and B and a scaling operator 100 for carrying out scaling operation when it becomes necessary to carry out the scaling process as a result of arithmetic operation of the RNS arithmetic operator 10. Here, the scaling operator 100 receives the arithmetic operation result of the RNS arithmetic operator 10 and calculates a quotient obtained by dividing the input number by one of moduli based on a result of subtraction between residue digits of the input number. Thereby, the scaling operator 100 can scale at high speed as compared to the case of scaling after converting once into binary number or decimal number by using the Chinese Remainder Theorem.

The RNS arithmetic operating system 5 has the RNS arithmetic operator 10 and the scaling operator 100 as described above.

The RNS arithmetic operator 10 receives operands A and B represented by the arithmetic residue format which is one example of the inventive second residue format and performs additions, subtractions or multiplications between A and B. In the present embodiment, the operand A is expressed by a set of a plurality of residues $(a^\uparrow_0, a^\uparrow_1, a_{\uparrow 2}, a^\uparrow_3)$ obtained by dividing the operand A by each of the plurality of first sub-moduli $\{m^\uparrow_0, m^\uparrow_1, m^\uparrow_2, m^\uparrow_3\}$ and a plurality of residues $(a^\downarrow_0, a^\downarrow_1, a^\downarrow_2)$ obtained by dividing the operand A by each of the plurality of second sub-moduli $\{m^\downarrow_0, m^\downarrow_1, m^\downarrow_2\}$. In the same manner, the operand B is expressed by a set of a plurality of residues $(b^\uparrow_0, b^\uparrow_1, b^\uparrow_2, b^\uparrow_3)$ and a plurality of residues $(b^\downarrow_0, b^\downarrow_1, b^\downarrow_2)$. The RNS arithmetic operator 10 has a plurality of residue operation ALUs 20 that perform additions, subtractions or multiplications between residues of the residue digits corresponding to the operands A and B.

The scaling operator 100 receives the arithmetic operation result $Y=(y^\uparrow_0, y^\uparrow_1, y^\uparrow_2, y^\uparrow_3, y^\downarrow_0, y^\downarrow_1, y^\downarrow_2)$ of the RNS arithmetic operator 10 as the input and calculates the quotient obtained by dividing the input Y by $m^\downarrow$ as a scaling result $Z=(z^\uparrow_0, z^\uparrow_1, z^\uparrow_2, z^\uparrow_3, z^\downarrow_0, z^\downarrow_1, z^\downarrow_2)$ of the arithmetic operation result Y. The scaling operator 100 has an overflow detector 110, a residue format converter 120, a subtracter 130, a quotient output section 140 and a residue format inverse converter 150.

The overflow detector 110 detects an overflow of the input Y inputted to the scaling operator 100. The residue format converter 120 converts the input Y represented by the arithmetic RNS into the input $Y=(y^\uparrow, y^\downarrow)$ represented by the scaling RNS. The subtracter 130 performs subtraction between the residue digits shown in Equation (3-5) described later for the input Y represented by the scaling RNS to output a of difference between moduli which is a value of difference between the residue digits. The quotient output section 140 outputs a scaling result $Z=(z^\uparrow, z^\downarrow)$ represented by the scaling RNS, i.e., the quotient Z obtained by dividing the input Y by $m^\downarrow$, based on the value of difference between moduli as shown in Equation (2-1). The residue format inverse converter 150 converts the scaling result Z represented by the scaling RNS into a scaling result $Z=(z^\uparrow_0, z^\uparrow_1, z^\uparrow_2, z^\uparrow_3, z^\downarrow_0, z^\downarrow_1, z^\downarrow_2)$ represented by the arithmetic RNS and outputs as the scaling result.

Figure 3:
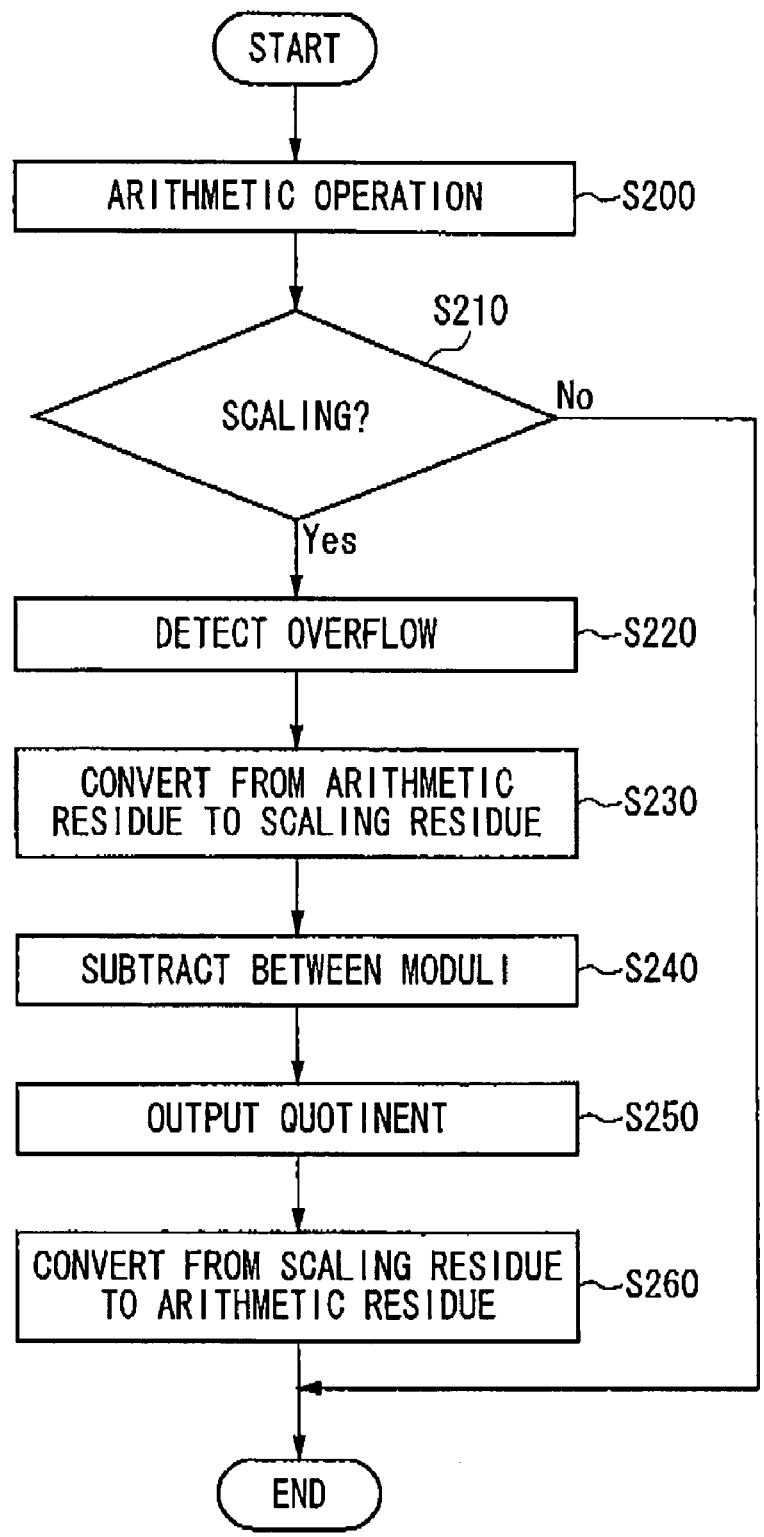
FIG. 3 shows an operation flow of the RNS arithmetic operating system according to the embodiment of the invention.

FIG. 3 shows an operation flow of the RNS arithmetic operating system 5 according to the embodiment of the invention.

At first, the RNS arithmetic operator 10 receives two operands A and B which are two numbers to be operated and caries out arithmetic operations of additions, subtractions or multiplications between the operands A and B in Step S200. Next, the RNS arithmetic operator 10 judges whether or not the arithmetic operation result Y should be scaled in Step S210. When scaling is not necessary, the RNS arithmetic operator 10 outputs the arithmetic operation result Y in the second residue format as an arithmetic operation result.

When scaling is necessary in contrary, the RNS arithmetic operator 10 inputs the arithmetic operation result Y in the second residue format into the scaling operator 100. The overflow detector 110 detects an overflow of the input number Y inputted to the scaling operator 100 in Step S220. That is, as described later in (1) in Complementary Explanation 1, the overflow detector 110 detects the overflow when an upper limit of the input number Y, i.e., a number-under-scaling, is restricted.

Still more, when the RNS arithmetic operating system 5 is realized by $m^\uparrow \neq m^\downarrow - 1$, the overflow detector 110 detects the overflow of the input number Y when a number obtained by dividing a product of the first modulus $m^\uparrow$ and the second modulus $m^\downarrow$ by an absolute value of a difference between the first modulus $m^\uparrow$ and the second modulus $m^\downarrow$ is larger than the input number Y. It allows the input number Y to be limited within a range in which Equations (3-13) and (3-16) described later in (2) or (3) of the Complementary Explanation 1 hold.

Next, the residue format converter 120 converts the input number Y represented by the arithmetic RNS into the input number Y represented by the scaling RNS. That is, the residue format converter 120 converts the input number Y in the arithmetic residue format in which the residue $y^{\uparrow}$ of the input number Y obtained with respect to the first modulus $m^{\uparrow}$ is represented by a plurality of first sub-residues $(y^{\uparrow}_0, y^{\uparrow}_1, y^{\uparrow}_2, y^{\uparrow}_3)$ obtained by dividing the input number Y by each one of the plurality of sub-moduli $\{m^{\uparrow}_0, m^{\uparrow}_1, m^{\uparrow}_2, m^{\uparrow}_3\}$ and a residue $y^{\downarrow}$ of the input number Y obtained with respect to the second modulus $m^{\downarrow}$ is represented by a plurality of second sub-residues $\{y^{\downarrow}_0, y^{\downarrow}_1, y^{\downarrow}_2\}$ obtained by dividing the input number by each one of the plurality of second sub-moduli $\{m^{\downarrow}_0, m^{\downarrow}_1, m^{\downarrow}_2\}$ into the input number Y in the scaling residue format.

Next, the subtracter 130 outputs the inter-moduli value of difference which is a value of difference between the residue $y^{\uparrow}$ obtained with respect to the first modulus $m^{\uparrow}$ and the residue $y^{\uparrow}$ obtained with respect to the second modulus $m^{\downarrow}$ in the input number Y. More specifically, the subtracter 130 calculates and outputs $(y^{\downarrow}-y^{\uparrow}) \bmod m^{\uparrow}$ or $(y^{\uparrow}-y^{\downarrow}) \bmod m^{\uparrow}$ shown in Equation (3-5), (3-6), (3-11) or (3-12) in the Complementary Explanation 1 described later as the inter-moduli value of difference. Here, the subtracter 130 may output an inter-moduli value of difference $(y^{\downarrow}-y^{\uparrow}) \bmod m^{\uparrow}$ obtained by subtracting the residue (e.g., $y^{\uparrow}$) obtained with respect to the larger modulus (e.g., $m^{\uparrow}$) from the residue (e.g., $y^{\downarrow}$) obtained with respect to the smaller modulus (e.g., $m^{\downarrow}$) among the first modulus $m^{\uparrow}$ and the second modulus $m^{\downarrow}$ in the input number in the residue format.

Then, based on the inter-moduli values of difference, the quotient outputting section 140 outputs the set of residues of the quotient q obtained with respect to the first modulus $m^{\uparrow}$ and residues of the quotient q obtained with respect to the second modulus $m^{\downarrow}$ as the quotient q. More specifically, the quotient outputting section 140 outputs the quotient q shown in Equations (3-10), (3-13) or (3-16) in the Complementary Explanation described later.

That is, when the difference between the first modulus $m^{\uparrow}$ and the second modulus $m^{\downarrow}$ is 1, the quotient outputting section 140 outputs the residue of the inter-moduli values of difference obtained with respect to the first modulus $m^{\uparrow}$ as the residue of the quotient q obtained with respect to the first modulus $m^{\uparrow}$ and the residue of the quotient q obtained with respect to the second modulus $m^{\downarrow}$ as shown in Equation (3-10). Still more, when Equation (3-10) is used, the quotient outputting section 140 may correct the residue digit by converting into q mod $m^{\uparrow}=0$ when q mod $m^{\uparrow}=m^{\downarrow}$ for example and may output the quotient q in the scaling residue format.

When the difference between the first modulus $m^{\uparrow}$ and the second modulus $m^{\downarrow}$ is not 1, the quotient outputting section 140 calculates a residue of a number, obtained with respect to the first modulus $m^{\uparrow}$, obtained by dividing the inter-moduli values of difference $(y^{\downarrow}-y^{\uparrow}) \bmod m^{\uparrow}$ or $(y^{\uparrow}-y^{\downarrow}) \bmod m^{\uparrow}$ by an absolute value of the difference between the first modulus $m^{\uparrow}$ and the second modulus $m^{\downarrow}|m^{\uparrow}-m^{\downarrow}|$ as a residue of the quotient q obtained with respect to the first modulus $m^{\uparrow}$ and a residue of the quotient q obtained with respect to the second modulus $m^{\downarrow}$ as shown in Equation (3-13) or (3-16).

Next, the residue format inverse converter 150 converts the quotient q in the scaling residue format outputted by the quotient outputting section 140 into a quotient q in the arithmetic residue format and outputs as a scaling result in the arithmetic residue format $Z=(z^{\uparrow}_0, z^{\uparrow}_1, z^{\uparrow}_2, z^{\uparrow}_3, z^{\downarrow}_0, z^{\downarrow}_1, z^{\downarrow}_2)$.

The RNS arithmetic operating system 5 described above allows the increase of both speed of additions, subtractions and multiplications by the RNS and of scaling operation because it carries out the scaling operation by using the scaling RNS while carrying out additions, subtractions and multiplications by using the arithmetic RNS.

Figure 4:
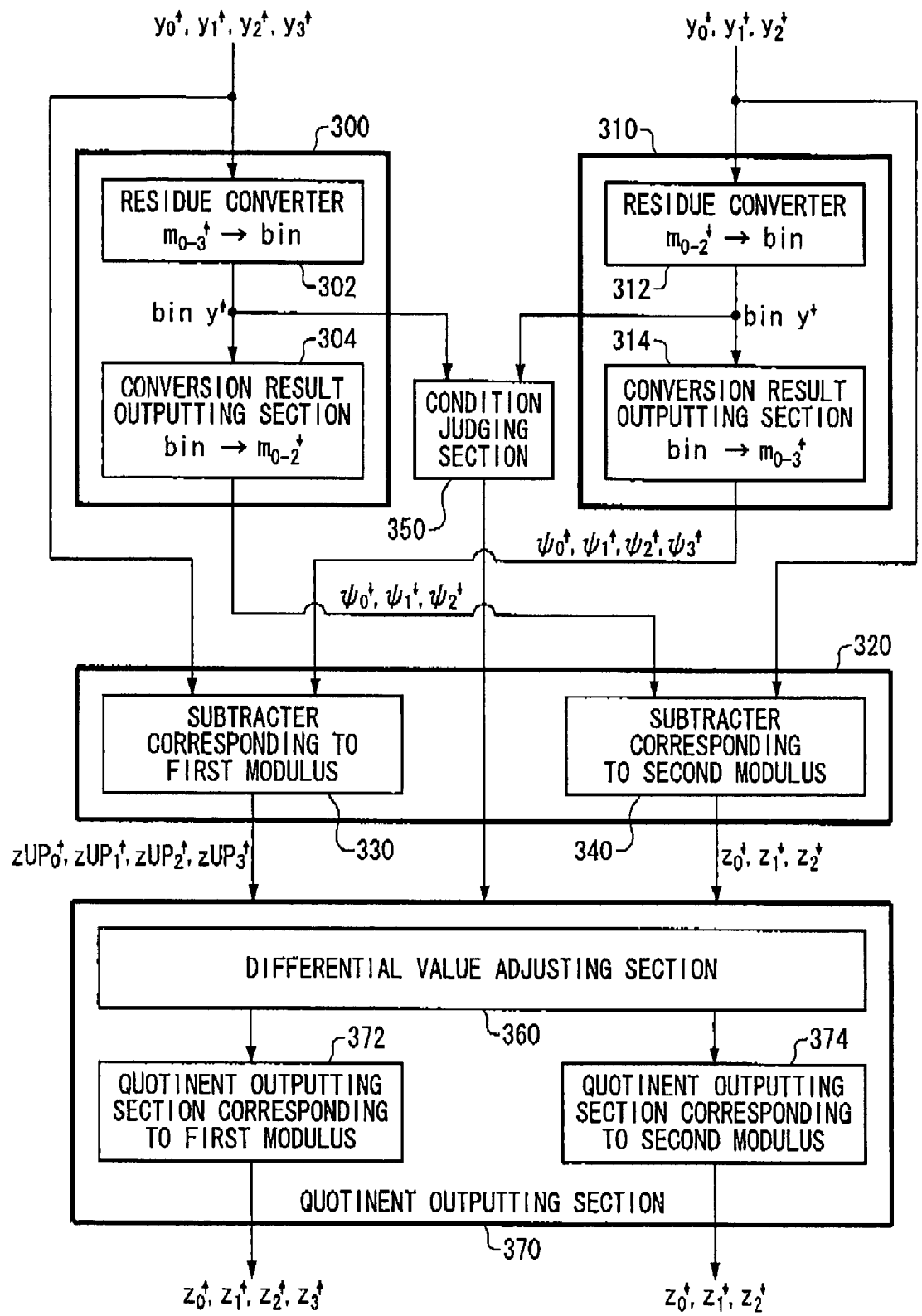
FIG. 4 shows a configuration of a scaling operator according to a first modification of the embodiment of the invention.

FIG. 4 is a diagram showing a configuration of the scaling operator 100 according to a first modification of the embodiment of the invention. Instead of converting the residue number system between the scaling RNS and the arithmetic RNS, the scaling operator 100 of the present modification converts a plurality of residue digits presented by a plurality of first sub-moduli $\{m^{\uparrow}_0, m^{\uparrow}_1, m^{\uparrow}_2, m^{\uparrow}_3\}$ corresponding to the first modulus $m^{\uparrow}$ into a plurality of residue digits represented by a plurality of second sub-moduli $\{m^{\downarrow}_0, m^{\downarrow}_1, m^{\downarrow}_2\}$ corresponding to the second modulus $m^{\downarrow}$ and calculates a value of difference between a residue with respect to the converted first modulus $m^{\uparrow}$ and a residue obtained with respect to the second modulus $m^{\downarrow}$ as a inter-moduli value of difference. It can thus reduce an overhead of the conversion process of the residue format converter 120 and the residue format inverse converter 150.

It is noted that conversion of residues between the modulus sub-sets $\{m^{\uparrow}_0, m^{\uparrow}_1, m^{\uparrow}_2, m^{\uparrow}_3\}$ and $\{m^{\downarrow}_0, m^{\downarrow}_1, m^{\downarrow}_2\}$ of the modulus set $\{\{m^{\uparrow}_0, m^{\uparrow}_1, m^{\uparrow}_2, m^{\uparrow}_3\}, \{m^{\downarrow}_0, m^{\downarrow}_1, m^{\downarrow}_2\}\}$ in the arithmetic RNS is called as 'Base Extention for Module Subset (ERMS)'.

The scaling operator 100 of this modification receives the input number Y in the arithmetic residue format in which a residue $y^{\uparrow}$ of the input number Y obtained with respect to the first modulus $m^{\uparrow}$ is represented by a plurality of first sub-residues $(y^{\uparrow}_0, y^{\uparrow}_1, y^{\uparrow}_2, y^{\uparrow}_3)$ obtained by dividing the input number Y by each one of the plurality of first sub-moduli $\{m^{\uparrow}_0, m^{\uparrow}_1, m^{\uparrow}_2, m^{\uparrow}_3\}$ and a residue $y^{\downarrow}$ of the input number Y obtained with respect to the second modulus $m^{\downarrow}$ is represented by a plurality of sub-residues $(y^{\downarrow}_0, y^{\downarrow}_1, y^{\downarrow}_2)$ obtained by dividing the input number Y by each one of the plurality of second sub-moduli $\{m^{\downarrow}_0, m^{\downarrow}_1, m^{\downarrow}_2\}$ and carries out scaling to this input number Y. The scaling operator 100 has a first sub-residue converting section 300, a second sub-residue converting section 310, a subtracter 320, a condition judging section 350 and a quotient outputting section 370.

The first sub-residue converting section 300 converts the residue $y^{\uparrow}$ of the input number Y obtained with respect to the first modulus $m^{\uparrow}$ represented by the plurality of first sub-residues $(y^{\uparrow}_0, y^{\uparrow}_1, y^{\uparrow}_2, y^{\uparrow}_3)$ into a plurality of first converted sub-residues $(\psi^{\downarrow}_0, \psi^{\downarrow}_1, \psi^{\downarrow}_2)$ which is residues obtained with respect to each one of the plurality of second sub-moduli $\{m^{\downarrow}_0, m^{\downarrow}_1, m^{\downarrow}_2\}$. The first sub-residue converting section 300 has a residue converter 302 for converting the residue $y^{\uparrow}$ obtained with respect to the first modulus $m^{\uparrow}$ represented by the plurality of sub-residues $(y^{\uparrow}_0, y^{\uparrow}_1, y^{\uparrow}_2, y^{\uparrow}_3)$ into a binary $y^{\uparrow}$ and a conversion result outputting section 304 for converting the binary $y^{\uparrow}$ into a plurality of first converted sub-residues $(\psi^{\downarrow}_0, \psi^{\downarrow}_1, \psi^{\downarrow}_2)$. Here, the plurality of first converted sub-residues $(\psi^{\downarrow}_0, \psi^{\downarrow}_1, \psi^{\downarrow}_2)$ may be represented as a scaling factor $\psi^{\downarrow}$, because it allows the scaling to be realized by finding a value of difference with the sub-residues $(y^{\downarrow}_0, y^{\downarrow}_1, y^{\downarrow}_2)$.

The second sub-residue converting section 310 converts the residue of the input number Y obtained with respect to the second modulus $m^{\downarrow}$ represented by the plurality of second sub-residues $(y^{\downarrow}_0, y^{\downarrow}_1, y^{\downarrow}_2)$ into a plurality of second converted sub-residues $\{\psi^{\uparrow}_0, \psi^{\uparrow}_1, \psi^{\uparrow}_2, \psi^{\uparrow}_3\}$ which are residues obtained with respect to each one of the plurality of first sub-moduli $\{m^\uparrow_0, m^\uparrow_1, m^\uparrow_2, m^\uparrow_3\}$. The second sub-residue converting section 310 has the residue converter 312 for converting a residue $y^\downarrow$ obtained with respect to the second modulus $m^\downarrow$ represented by the plurality of second sub-residues ($y^\downarrow_0, y^\downarrow_1, y^\downarrow_2$) into a binary $y^\downarrow$ and a conversion result outputting section 314 for converting the binary $y^\downarrow$ into a plurality of second converted sub-residues ($\psi^\uparrow_0, \psi^\uparrow_1, \psi^\uparrow_2, \psi^\uparrow_3$). Here, the plurality of second converted sub-residues ($\psi^\uparrow_0, \psi^\uparrow_1, \psi^\uparrow_2, \psi^\uparrow_3$) may be represented as a scaling factor $\psi^\uparrow$.

The subtracter 320 outputs an inter-moduli value of difference which is a value of difference between the residue $y^\uparrow$ obtained with respect to the first modulus $m^\uparrow$ and the residue $y^\downarrow$ obtained with respect to the second modulus $m^\downarrow$ in the input number Y. The subtracter 320 has a subtracter-corresponding-to-first modulus 330 and a subtracter-corresponding-to-second modulus 340.

The subtracter-corresponding-to-first modulus 330 outputs a second inter-moduli value of difference ($zUP^\uparrow_0$, $zUP^\uparrow_1, zUP^\uparrow_2, zUP^\uparrow_3$) which is a value of difference between the plurality of second converted sub-residues ($\psi^\uparrow_0, \psi^\uparrow_1, \psi^\uparrow_2, \psi^\uparrow_3$) representing the residue $y^\downarrow$ of the input number Y obtained with respect to the second modulus $m^\downarrow$ and the plurality of first sub-residues ($y^\uparrow_0, y^\uparrow_1, y^\uparrow_2, y^\uparrow_3$) representing the residue $y^\uparrow$ of the input number Y obtained with respect to the first modulus $m^\uparrow$ and is represented by a plurality of residues obtained by dividing the value of difference by each one of the plurality of first sub-moduli $\{m^\uparrow_0, m^\uparrow_1, m^\uparrow_2, m^\uparrow_3\}$.

The subtracter-corresponding-to-second modulus 340 outputs a first inter-moduli value of difference which is a value of difference between the first converted sub-residues ($\psi^\downarrow_0, \psi^\downarrow_1, \psi^\downarrow_2$) representing the residue $y^\uparrow$ of the input number Y obtained with respect to the first modulus $m^\uparrow$ and the plurality of second sub-residues ($y^\downarrow_0, y^\downarrow_1, y^\downarrow_2$) representing the residue $y^\downarrow$ of the input number Y obtained with respect to the second modulus $m^\downarrow$ and which is represented by a plurality of residues obtained by dividing the value of difference by each one of the plurality of second sub-moduli $\{m^\downarrow_0, m^\downarrow_1, m^\downarrow_2\}$. As shown in Complementary Explanation 1 described later, the first inter-moduli values of difference becomes equal with the scaling result ($z^\downarrow_0, z^\downarrow_1, z^\downarrow_2$) when $m^\uparrow=m^\downarrow-1$.

The condition judging section 350 judges whether or not a residue bin $y^\uparrow$ of the input number Y obtained with respect to the first modulus $m^\uparrow$ outputted by the residue converter 302 within the first sub-residue converting section 300 in the binary format and a residue bin $y^\downarrow$ of the input number Y obtained with respect to the second modulus $m^\downarrow$ outputted by the second sub-residue converting section 310 within the first sub-residue converting section 300 in the binary format meet with a relationship of the order of their magnitudes in advance.

When the first modulus is greater than the second modulus by 1 here (when $m^\uparrow=m^\downarrow-1$), the condition judging section 350 judges that the residue $y^\uparrow$ of the input number obtained with respect to the first modulus $m^\uparrow$ and the residue $y^\downarrow$ of the input number obtained with respect to the second modulus $m^\downarrow$ meet with a relationship of the order of their magnitudes in advance when die residue bin $y^\uparrow$ of the input number Y obtained with respect to the first modulus $m^\uparrow$ is larger than the residue bin $y^\downarrow$ of the input number obtained with respect to the second modulus $m^\downarrow$ as shown in Complementary Explanation 2 described later.

Based on the first and second inter-moduli values of difference, the quotient outputting section 370 outputs a set of residues $z^\uparrow=(z^\uparrow_0, z^\uparrow_1, z^\uparrow_2, z^\uparrow_3)$ of the quotient q obtained with respect to the first modulus $m^\uparrow$ and residues $z^\downarrow=(z^\downarrow_0, Z^\downarrow_1, z^\downarrow_2)$ of the quotient q obtained with respect to the second modulus $m^\downarrow$, i.e., the scaling result, as the quotient q. The quotient outputting section 370 includes a value-of-difference adjusting section 360, a quotient outputting section-corresponding-to-first modulus 372 and a quotient outputting section-corresponding-to-second modulus 374.

When the condition judging section 350 judges that the residue $y^\uparrow$ of the input number obtained with respect to the first modulus $m^\uparrow$ and the residue $y^\downarrow$ of the input number obtained with respect to the second modulus $m^\downarrow$ meet with the relationship of the order of their magnitudes in advance, the value-of-difference adjusting section 360 feeds first and second inter-moduli values of difference modified by adding a preset constant to one of the first and second inter-moduli values of difference respectively to the quotient outputting section-corresponding-to-first modulus 372 and the quotient outputting section-corresponding-to-second modulus 374. Here, when $m^\downarrow=m^\uparrow-1$ and when the condition judging section 350 judges that the relationship of size of bin $y^\downarrow$<bin $y^\uparrow$ is met, the value-of-difference adjusting section 360 feeds the second inter-moduli values of difference modified by adding 1 to the second inter-moduli values of difference ($zUP^\uparrow_0, zUP^\uparrow_1, zUP^\uparrow_2, zUP^\uparrow_3$) to the quotient outputting section-corresponding-to-first modulus 372 and feeds the first inter-moduli values of difference to the quotient outputting section-corresponding-to-second modulus 374, respectively.

Based on the second inter-moduli values of difference fed from the value-of-difference adjusting section 360, the quotient outputting section-corresponding-to-first modulus 372 outputs a residue $z^\uparrow$, obtained with respect to the first modulus $m^\uparrow$, of the quotient which is the scaling result Z and is represented by the plurality of residues ($z^\uparrow_0, z^\uparrow_1, z^\uparrow_2, z^\uparrow_3$) obtained with respect to each one of the plurality of first sub-moduli $\{m^\uparrow_0, m^\uparrow_1, m^\uparrow_2, m^\uparrow_3\}$. When $m^\downarrow=m^\uparrow-1$ here, the quotient outputting section-corresponding-to-first modulus 372 outputs the second inter-moduli values of difference adjusted by the value-of-difference adjusting section 360 as a residue of the quotient q, obtained with respect to the first modulus $m^\uparrow$, represented by plurality of residues $\{z^\uparrow_0, z^\uparrow_1, z^\uparrow_2, z_3\}$ with respect to each one of the first sub-moduli $\{m^\uparrow_0, m^\uparrow_1, m^\uparrow_2, m^\uparrow_3\}$.

Based on the first inter-moduli values of difference, the quotient outputting section-corresponding-to-second modulus 374 outputs a residue $z^\downarrow$, obtained with respect to the second modulus $m^\downarrow$, of the quotient which is the scaling result Z and is represented by the plurality of residues $\{z^\downarrow_0, z^\downarrow_1, z^\downarrow_2\}$ with respect to each one of the plurality of second sub-moduli $\{m^\downarrow_0, m^\downarrow_1, m^\downarrow_2\}$. When $m^\downarrow=m^\uparrow-1$ here, the quotient outputting section-corresponding-to-second modulus 374 outputs the first inter-moduli values of difference as a residue, obtained with respect to the second modulus $m^\downarrow$, of the quotient represented by the plurality of residues $\{z^\downarrow_0, z^\downarrow_1, z^\downarrow_2\}$ with respect to each one of the plurality of second sub-moduli $\{m^\downarrow_0, m^\downarrow_1, m^\downarrow_2\}$.

Figure 5:
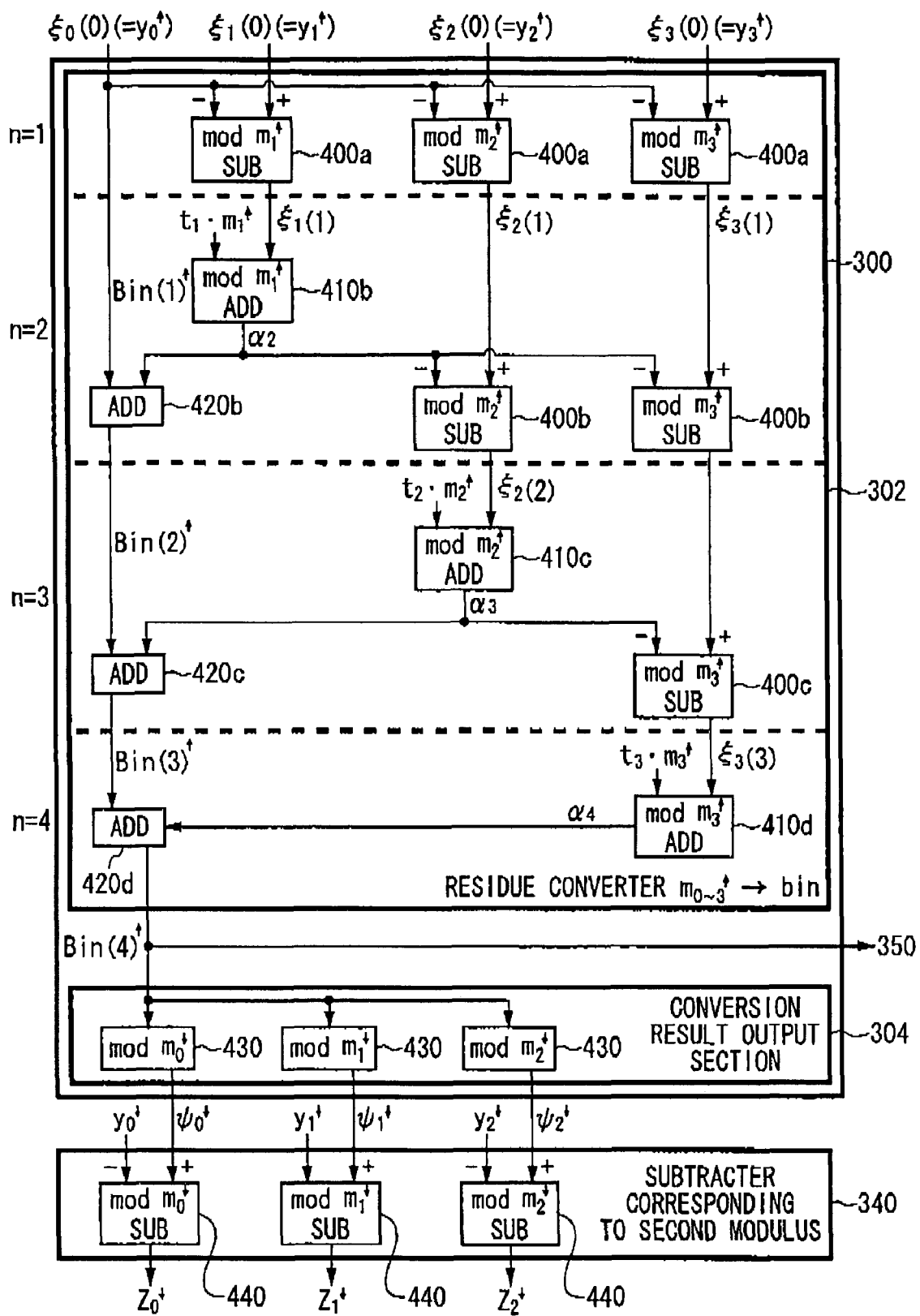
FIG. 5 shows a configuration of a first sub-residue converting section and a subtracter-corresponding-to-second modulus according to the first modification of the embodiment of the invention.

FIG. 5 shows a configuration of the first sub-residue converting section 300 and the subtracter-corresponding-to-second modulus 340 according to the first modification of the embodiment of the invention. It is noted that because the second sub-residue converting section 310 and the subtracter-corresponding-to-first modulus 330 have almost same configurations with the first sub-residue converting section 300 and the subtracter-corresponding-to-second modulus 340 except of that a number of residue digits is different, explanation thereof will be omitted here.

The residue converter 302 within the first sub-residue converting section 300 receives the residue $y^\uparrow$ of the input number Y obtained with respect to the first modulus $m^\uparrow$ represented by the plurality of first sub-residues ($y^\uparrow_0, y_{\uparrow 1}, y^\uparrow_2, y^\uparrow_3$)

as initial values ($\xi_0(0)$, $\xi_1(0)$, $\xi_2(0)$, $\xi_3(0)$) of a value-under-conversion≡(0) to be converted into the format of residue with respect to each one of the plurality of second sub-moduli $\{m^\downarrow_0, m^\downarrow_1, m^\downarrow_2\}$. Then, the residue converter 302 converts the residue $y^\uparrow$ obtained with respect to the first modulus $m^\uparrow$ into a binary number.

The residue converter 302 includes number-under-conversion subtracters 400a through 400c, conversion factor calculating sections 410b through 410d and conversion factor adders 420b through 420d.

The value-under-conversion subtracter 400a outputs a value-under-conversion≡(1) by subtracting a residue-under-conversion $\xi_0(0)$ from the value-under-conversion≡(0) in order to convert the residue-under-conversion $\xi_0(0)$ corresponding to the first modulus $m^\uparrow$ into 0 among the plurality of residue-under-conversions ($\xi_0(0)$, $\xi_1(0)$, $\xi_2(0)$, $\xi_3(0)$) obtained by dividing the value-under-conversion≡(0) by each one of the plurality of first sub-moduli $\{m^\uparrow_0, m^\uparrow_1, m^\uparrow_2, m^\uparrow_3\}$ when the value-under-conversion≡(0). As a result, the residue corresponding to the first sub-modulus $m^\uparrow_0$ of the value-under-conversion≡(1) becomes 0 and≡(1)=(0, $\xi_1(0)-\xi_0(0)$, $\xi_2(0)-\xi_0(0)$, $\xi_3(0)-\xi_0(0)$)=(0, $\xi_1(1)$, $\xi_2(1)$, $\xi_3(1)$). Then, $\xi_0(0)$ subtracted from the value-under-conversion≡(0) is inputted to the conversion factor adder 420b as a conversion factor $\alpha_1$ used for converting the residue-under-conversion $\xi_0(0)$ into 0.

The conversion factor calculating section 410b calculates a conversion factor $\alpha_2$ that converts the residue-under-conversion $\xi_1(1)$ into 0 and keeps the residue-under-conversion corresponding to the first sub-modulus $m^\uparrow_0$, already converted into 0, at 0 when subtracted from the value-under-conversion≡(1). It is noted that conditions to be met by the conversion factor $\alpha_n$ will be described later.

The conversion factor adder 420b adds the conversion factor $\alpha_2$ calculated by the conversion factor calculating section 410b and represented in binary to the conversion factor $\alpha_1$. Here, because $y^\uparrow$ is smaller than the first modulus $m^\uparrow$, the additional value of the conversion factor may be considered as a residue obtained with respect to the first modulus $m^\uparrow$.

The value-under-conversion subtracter 400b outputs a value-under-conversion≡(2) by subtracting the conversion factor α2 calculated by the conversion factor calculating section 410b and represented by the residue obtained with respect to the first modulus $m^\uparrow$ from the value-under-conversion≡(1). As a result, the residue-under-conversions corresponding to the two first sub-modulus $m^\uparrow_0$ and $m^\uparrow_1$ of the value-under-conversion≡(2) becomes 0, respectively, and≡(2)=(0, 0, $\xi_2(1)-\xi_1(1)$, $\xi_3(1)-(1)$)=(0, 0, $\xi_2(2)$, $\xi_3(2)$).

The conversion factor calculating section 410c calculates a conversion factor $\alpha_3$ that converts the residue-under-conversion $\xi_2(2)$ into 0 and keeps the residue-under-conversion corresponding to the two first sub-moduli $m^\uparrow_0$ and $m^\uparrow_1$, already converted into 0, at 0 when subtracted from the value-under-conversion≡(2).

The conversion factor adder 420c adds the conversion factor $\alpha_3$ calculated by the conversion factor calculating section 410c and represented in binary to the added value of the conversion factors $\alpha_1$ and $\alpha_2$.

The value-under-conversion subtracter 400c outputs a value-under-conversion≡(3) by subtracting the conversion factor α3 calculated by the conversion factor calculating section 410c and represented by the residue obtained with respect to the first modulus $m^\uparrow$ from the value-under-conversion≡(2). As a result, the residue-under-conversions corresponding to the three first sub-modulus $m^\uparrow_0$ through $m^\uparrow_2$ of the value-under-conversion≡(3) becomes 0, respectively, and≡(3)=(0, 0, 0, $\xi_3(2)-\xi_2(2)$)=(0, 0, 0, $\xi_3(3)$).

The conversion factor calculating section 410c calculates a conversion factor $\alpha_4$ that converts the residue-under-conversion $\xi_3(3)$ into 0 and keeps the residue-under-conversions corresponding to the tee first sub-moduli $m^\uparrow_0$ through $m^\uparrow_2$, already converted into 0, at 0 when subtracted from the value-under-conversion≡(3).

The conversion factor adder 420d adds the conversion factor $\alpha_4$ calculated by the conversion factor calculating section 410d and represented in binary to the added value of the conversion factors $\alpha_1$ through $\alpha_3$. Then, the conversion factor adder 420d outputs the added value of all conversion factors as a binary residue $y^\uparrow$.

The conversion factor calculating sections 410b through 410d described above calculate a least natural number which is a multiple of one or plurality of first sub-moduli already converted into 1 with respect to a conversion factor $\alpha_1$, which converts a residue-under-conversion to be converted into 0 to 0 and which meets with the following Equation (2-4). It is noted that $s_n$ and $t_n$ are natural numbers.

$$\alpha_n = s_n \prod_{i=0}^{n-2} m^\downarrow i, \qquad (2\text{-}4)$$

$$\alpha_n = t_n \cdot m^\downarrow_{n-1} + \xi(n-1)_{n-1}$$

As described above, the binary $y^\uparrow$ corresponding to $y^\uparrow$ may be obtained at the point of time when the value-under-conversion becomes 0 by sequentially adding the conversion factor subtracted from the value-under-conversion in binary number while sequentially residue-subtracting the conversion factor from the value-under-conversion whose initial value is $y^\uparrow$.

The conversion result outputting section 304 outputs the plurality of residues obtained by dividing the binary residue $y^\uparrow$ which is the added value obtained by adding all of the conversion factors $\alpha_1$ through $\alpha_4$ calculated with respect to all of the plurality of residues-under-conversion by the conversion factor adders 420b through 420d by each one of the plurality of second sub-moduli $\{m^\downarrow_0, m^\downarrow_1, m^\downarrow_2\}$ as a plurality of first converted sub-residues $\{m^\downarrow_0, m^\downarrow_1, m^\downarrow_2\}$. The conversion result outputting section 304 has a plurality of residue arithmetic operators 430 for calculating a plurality of first converted sub-residues ($\psi^\downarrow_0, \psi^\downarrow_1, \psi^\downarrow_2$) which are residues of the binary residue $y^\uparrow$ with respect to each one of the plurality of second sub-moduli $\{m^\downarrow_0, m^\downarrow_1, m^\downarrow_2\}$.

The subtracter-corresponding-to-second modulus 340 has a plurality of residue subtracters 440 for carrying out subtractions between residue digits corresponding to each of the plurality of second sub-moduli $\{m^\downarrow_0, m^\downarrow_1, m^\downarrow_2\}$ and outputs first inter-moduli values of difference ($z^\downarrow_0, z^\downarrow_1, z^\downarrow_2$) which are values of difference between the first converted sub-residues ($\psi^\downarrow_0, \psi^\downarrow_1, \psi^\downarrow_2$) and the plurality of second sub-residues ($y^\downarrow_0, y^\downarrow_1, y^\downarrow_2$).

Figure 6:
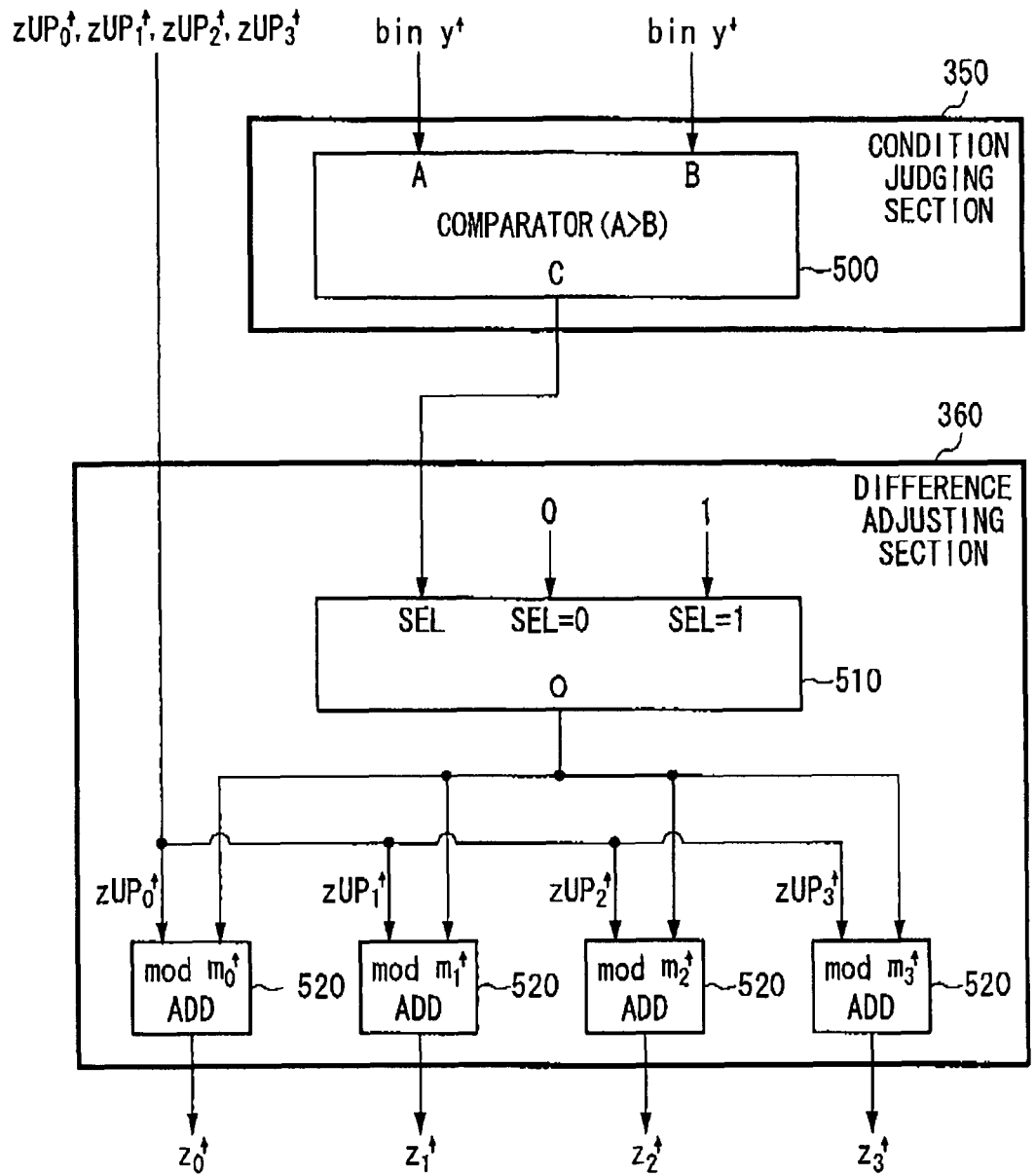
FIG. 6 shows a configuration of a condition judging section and a value-of-difference adjusting section according to the first modification of the embodiment of the invention.

FIG. 6 shows a configuration of the condition judging section 350 and the value-of-difference adjusting section 360 according to the first modification of the embodiment of the invention.

The condition-judging section 350 judges whether or not the residue bin $y^\uparrow$ of the input number Y obtained with respect to the first modulus $m^\uparrow$ and the residue bin $y^\downarrow$ of the input number Y obtained with respect to the second modulus $m^\downarrow$ meet the relationship of the order of their magnitudes in advance. The condition judging section 350 has a comparator 500 that outputs logic value 1 when the first modulus is greater than the second modulus ($m^\uparrow = m^\downarrow - 1$) and when the residue bin $y^\uparrow$ of the input number Y obtained with respect to the first modulus $m^\uparrow$ is greater than the residue bin $y^\downarrow$ of the input number Y obtained with respect to the second modulus $m^\downarrow$.

The value-of-difference adjusting section 360 has a selector 510 that selects an output value 0 when the comparator 500 outputs logic value 0 and selects an output value 1 when the comparator 500 outputs logic value 1 and a plurality of residue adders 520 that adds the output value of the selector 510 to the second inter-moduli values of difference ($zUP^\uparrow_0$, $zUP^\uparrow_1$, $zUP^\uparrow_2$, $zUP^\uparrow_3$).

The scaling operator 100 can adjust the second inter-moduli values of difference ($zUP^\uparrow_0$, $zUP^\uparrow_1$, $zUP^\uparrow_2$, $zUP^\uparrow_3$) by using the method shown in Equations (4-8) and (4-9) and can output a residue $z^\uparrow = (z^\uparrow_0, z^\uparrow_1, z^\uparrow_2, z^\uparrow_3)$ of the scaling result Z obtained with respect to the first modulus $m^\uparrow$ by the condition judging section 350 and the value-of-difference adjusting section 360 described above.

Figure 7:
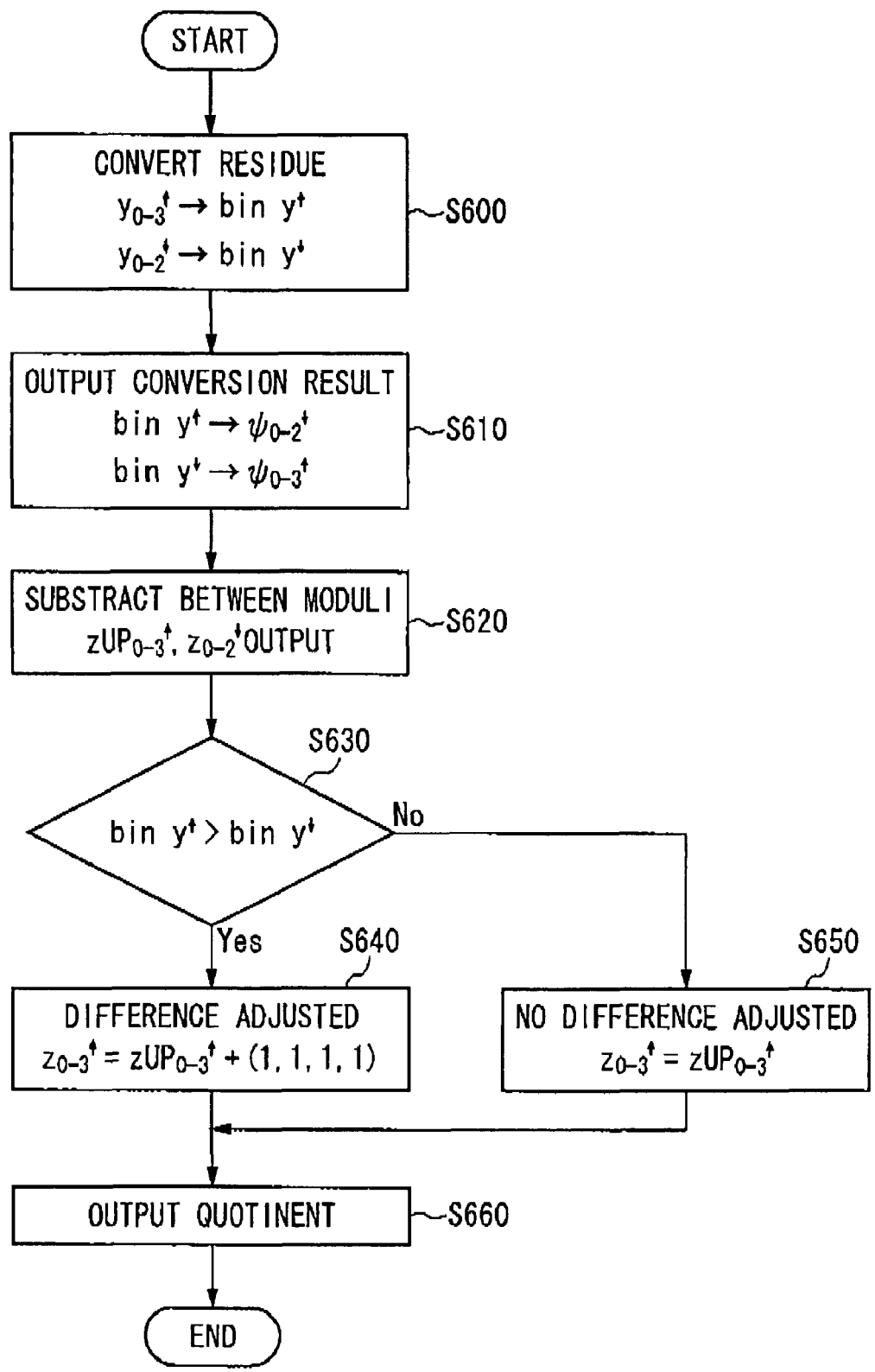
FIG. 7 shows an operation flow of the scaling operator according to the first modification of the embodiment of the invention.

FIG. 7 shows an operation flow of the scaling operator 100 according to the first modification of the embodiment of the invention.

When the input number Y which is a number-under-scaling in the arithmetic residue format is inputted, the residue converter 302 within the first sub-residue converting section 300 converts the residue $y^\uparrow$ of the input number Y obtained with respect to the first modulus $m^\uparrow$ represented by the plurality of first sub-residues ($y^\uparrow_0, y^\uparrow_1, y^\uparrow_2, y^\uparrow_3$) into the binary $y^\uparrow$ in Step S600. The residue converter 312 within the second sub-residue converting section 310 also converts the residue, obtained with respect to the second modulus $m^\downarrow$, represented by plurality of second sub-residues ($y^\downarrow_0, y^\downarrow_1, y^\downarrow_2$) into the binary $y^\downarrow$.

More specifically, the conversion factor calculating sections 410b through 410d within the residue converter 302 calculates conversion factor $\alpha_{n+1}$ which sequentially converts the residue-under-conversion $\xi_{On}$ into 0 and keeps all of the other residues-under conversion $\xi_0$ through $\xi_{n+1}$, which have been already converted to 0, at 0 when subtracted from value-under-conversion$\equiv$(n) for each of the plurality of residues-under-conversion ($\xi_0, \xi_1, \xi_2, \xi_3$) obtained by diving the value-under-conversion$\equiv$(n) by each one of the plurality of first sub-moduli $\{m^\uparrow_0, m^\uparrow_1, m^\uparrow_2, m^\uparrow_3\}$ in the value-under-conversion$\equiv$(n) in which the residue $y^\uparrow$ in the input number Y represented by the plurality of first sub-residues ($y^\uparrow_0, y^\uparrow_1, y^\uparrow_2, y^\uparrow_3$) obtained with respect to the first modulus $m^\uparrow$ is the initial value$\equiv$(0).

Here, the residue converter 302 adopts $\xi_0$ as the conversion factor $\alpha_1$ as for the first residues-under-conversion $\xi_0$. Then, the value-under-conversion subtracter 400a subtracts the conversion factor $\alpha_1$ from each residue digit of the value-under-conversion$\equiv$(0) to update the value-under-conversion to$\equiv$(1).

Next, the conversion factor adders 420b through 420d within the residue converter 302 sequentially add the conversion factor $\alpha_{n+1}$ sequentially calculated by the conversion factor calculating sections 410b through 410d and represented by the residues obtained with respect to the first modulus $m^\uparrow$. Then, the value-under-conversion subtracters 400b through 400d sequentially subtract the conversion factor $\alpha_{n+1}$ sequentially calculated by the conversion factor calculating sections 410b through 410c and represented by the residues obtained with respect to the fast modulus $m^\uparrow$ from the value-under-conversion$\equiv$(n).

Next, the conversion result outputting section 304 converts the binary $y^\uparrow$ into the plurality of first converted sub-residues ($\psi^\downarrow_0, \psi^\downarrow_1, \psi^\downarrow_2$) and the scaling operator 341 converts the binary $y^\downarrow$ into the plurality of second converted sub-residues autos $\{\psi^\uparrow_0, \psi^\uparrow_1, \psi^\uparrow_2, \psi^\uparrow_3\}$ in Step S610. Then, the subtracter 320 outputs the first inter-moduli value of difference ($z^\downarrow_0, z^\downarrow_1, z^\downarrow_2$) and the second inter-moduli values of difference ($zUP^\uparrow_0, zUP^\uparrow_1, zUP^\uparrow_2, zUP^\uparrow_3$) which are the values of difference between the residue $y^\uparrow$ obtained with respect to the first modulus $m^\uparrow$ and the residue $y^\downarrow$ obtained with respect to the second modulus $m^\downarrow$ in the input number Y in Step S620.

Next, when the residue bin $y^\uparrow$ of the input number Y obtained with respect to the first modulus $m^\uparrow$ is greeter than the residue bin $y^\downarrow$ of the input number Y obtained with respect to the second modulus $m^\downarrow$, the condition judging section 350 judges that $y^\uparrow$ and $y^\downarrow$ meet the relationship of the order of their magnitudes in advance.

When $y^\uparrow$ and $y^\downarrow$ meet the relationship of the order of their magnitudes in advance, i.e., Yes in Step S630, the value difference adjusting section 360 adjusts the second inter-moduli values of difference ($zUP^\uparrow_0, zUP^\uparrow_1, zUP^\uparrow_2, zUP^\uparrow_3$) in Step S640. When $y^\uparrow$ and $y^\downarrow$ do not meet the relationship of the order of their magnitudes in advance in contrary, i.e., No in Step S630, the value-of-difference adjusting section 360 outputs them to the quotient outputting section 370 as they are without adjusting the second inter-moduli values of difference ($zUP^\uparrow_0, zUP^\uparrow_1, zUP^\uparrow_2, zUP^\uparrow_3$).

Next, based on the first and second inter-moduli values of difference, the quotient outputting section 370 outputs a set of residues $z^\uparrow = (z^\uparrow_0, z^\uparrow_1, z^\uparrow_2, z^\uparrow_3)$ of the quotient q obtained with respect to the first modulus $m^\uparrow$ and residues $z^\downarrow = (z^\downarrow_0, z^\downarrow_1, z^\downarrow_2)$ of the quotient q obtained with respect to the second modulus $m^\downarrow$, i.e., the scaling result Z, as the quotient q in Step S660.

As described above, the scaling operator 100 of the first modification calculates the inter-moduli values of difference by converting part of the plurality of residue digits in the arithmetic RNS into representation in the other plurality of residue digits. It allows the overhead in the converting process to be reduced as compared to the case of converting RNS between the scaling RNS and the arithmetic RNS.

It is noted that the conversion factor calculating sections 410b through 410d described above may be realized by means of a look-up table for receiving each residues-under-conversion $\xi$ and outputting a conversion factor $\alpha$ corresponding to that residues-under-conversion $\xi$, instead of the RNS adders. More specifically, the conversion factor calculating sections 410b through 410d may have a memory for storing a conversion factor corresponding to the residue-under-conversion in an address corresponding to the residue-under-conversion for each of the plurality of residue-under-conversion and may output the conversion factor corresponding to the residue-under-conversion out of the memory.

In this case, the memory may store the conversion factor corresponding to the residue-under-conversion as two types of data of binary number and a plurality of residues obtained with respect to the plurality of second sub-moduli in the address corresponding to the value of the residue-under-conversion. It allows the binary conversion factor to be fed from the conversion factor calculating sections 410b through 410d to the conversion factor adders 420b through 420d and the conversion factor fed to the value-under-conversion subtracters 400b and 400c and represented by the plurality of second sub-moduli to be directly read and to be fed out of the memory.

Still more, the conversion factor calculating sections 410b through 410d may calculate the conversion factor $\alpha_{n+1}$ in order from the residue-under-conversion $\xi_n$ corresponding to the greater first sub-modulus $m^\uparrow$ among the plurality of first sub-moduli $m^\uparrow_0$ through $m^\uparrow_{j-1}$ for each of the plurality of values-under-conversion $\xi$ in the value-under-conversion$\equiv$. It allows a volume of hardware to be reduced when the conversion factor calculating sections 410b through 410d are configured by a look-up table or the like.

Instead of providing the conversion factor calculating sections 410b through 410d, the subtracter-corresponding-to-second modulus 340 may calculate and output the first inter-moduli values of difference by sequentially subtracting the conversion factors sequentially calculated by the conversion factor calculating sections 410b through 410d from the residues $(y^\downarrow_0, y^\downarrow_1, y^\downarrow_2)$ of the input number Y with respect to the second modulus. More specifically, the subtracter-corresponding-to-second modulus 340 may output first inter-moduli value of difference $(z^\downarrow_0, z^\downarrow_1, z^\downarrow_2)$ represented by the plurality of residues obtained with respect to each one of the plurality of second sub-moduli $\{m^\downarrow_0, m^\downarrow_1, m^\downarrow_2\}$ by sequentially subtracting the conversion factor $\alpha_n$ represented by the plurality of residues obtained with respect to each one of the plurality of second sub-moduli $\{m^\downarrow_0, m^\downarrow_1, m^\downarrow_2\}$ from the residues $(y^\downarrow_0, y^\downarrow_1, y^\downarrow_2)$ of the input number Y, obtained with respect to the second sub-moduli $\{m^\downarrow_0, m^\downarrow_1, m^\downarrow_2\}$, represented by the plurality of second sub-residues $\{m^\downarrow_0, m^\downarrow_1, m^\downarrow_2\}$ sequentially calculated by the conversion factor calculating sections 410b through 410d.

Figure 8:
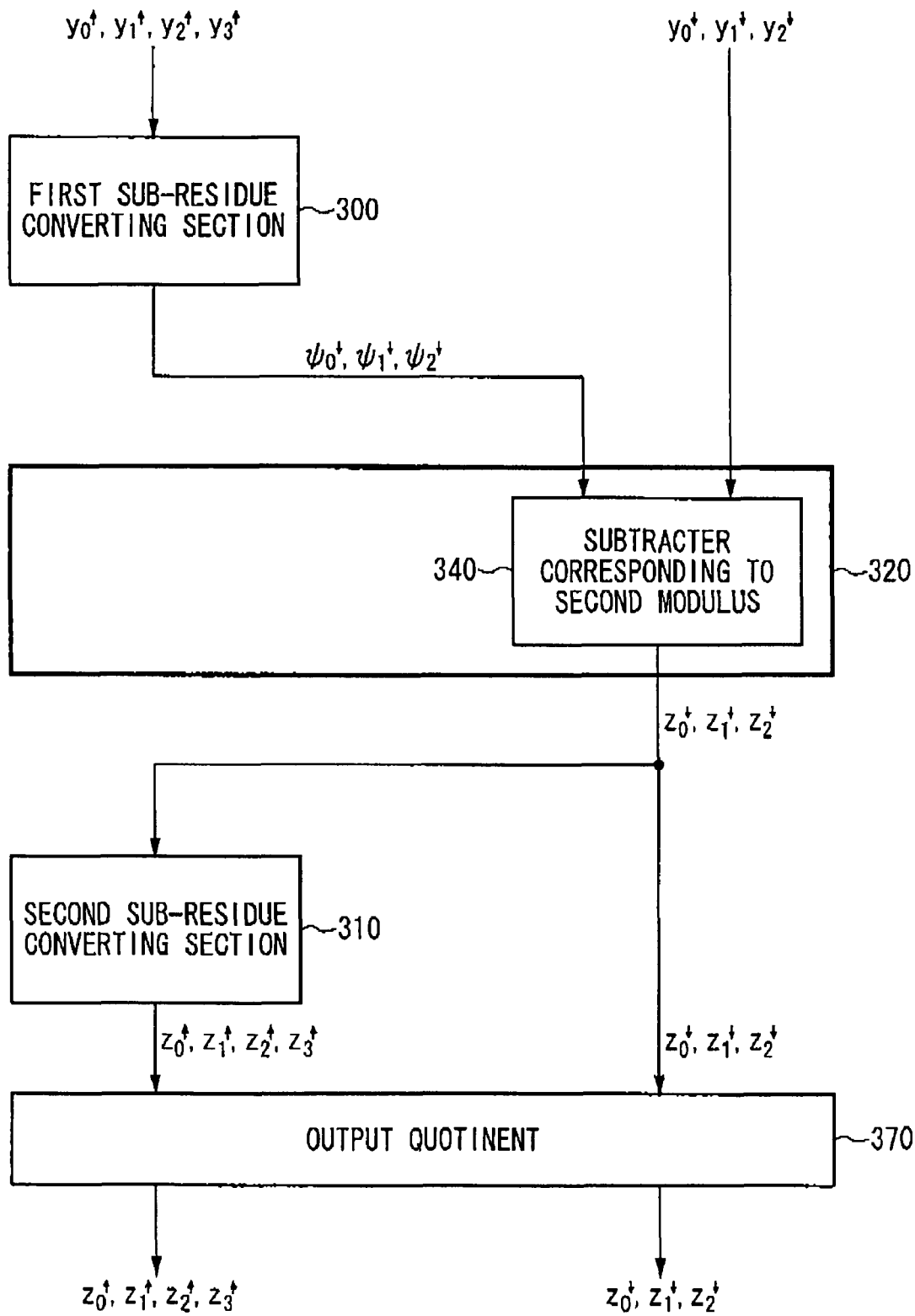
FIG. 8 shows a configuration of the scaling operator according to a second modification of the embodiment of the invention.

FIG. 8 shows a configuration of the scaling operator 100 according to a second modification of the embodiment of the invention. The scaling operator 100 of the present modification calculates another scaling result $Z \bmod m^\uparrow = z^\uparrow = (z^\uparrow_0, z^\uparrow_1, z^\uparrow_2, z^\uparrow_3)$ from one scaling result $Z \bmod m^\downarrow = z^\downarrow = (z^\downarrow_0, z^\downarrow_1, z^\downarrow_2)$. Since $Z \leq m^\uparrow$ from Equation (3-8) described later, the following Equation (2-5) holds by applying Equation (3-9) described later.

$$Z \bmod m^\uparrow = Z \bmod m^\downarrow \Rightarrow z^\uparrow = z^\downarrow \quad (2-5)$$

Accordingly, the use of the second sub-residue converting section 310 shown in FIG. 4 allows the scaling result $(z^\downarrow_0, z^\downarrow_1, z^\downarrow_2)$ which is the first inter-moduli values of difference represented by the plurality of residues obtained with respect to each one of the plurality of second sub-moduli $\{m^\downarrow_0, m^\downarrow_1, m^\downarrow_2\}$ to be converted into the scaling result $\{z^\uparrow_0, z^\uparrow_1, z^\uparrow_2, z^\uparrow_3\}$ which is converted inter-moduli values of difference represented by the plurality of residues obtained with respect to each one of the plurality of first sub-moduli $\{m^\uparrow_0, m^\uparrow_1, m^\uparrow_2, m^\uparrow_3\}$.

The scaling operator 100 of the present modification has a first sub-residue converting section 300, a subtracter 320 containing a subtracter-corresponding-to-second modulus 340, a second sub-residue converting section 310 and a quotient outputting section 370. Because the first sub-residue converting section 300, the second sub-residue converting section 310, the subtracter-corresponding-to-second modulus 340 and the quotient outputting section 370 of the present modification have the same function and configuration respectively with the first sub-residue converting section 300, the second sub-residue converting section 310, the subtracter-corresponding-to-second modulus 340 and the quotient outputting section 370 shown in FIG. 4, their explanation will be omitted here except of the following differences.

The subtracter 320 outputs the first inter-moduli values of difference outputted by the subtracter-corresponding-to-second modulus 340 as a inter-moduli value of difference which is a value of difference between the residue $y^\uparrow$ obtained with respect to the first modulus $m^\uparrow$ and the residue $y^\downarrow$ obtained with respect to the second modulus $m^\downarrow$ in the input number Y. As shown in Complementary Explanation 1 described later, the first inter-moduli values of difference becomes equal to the scaling result $(z^\downarrow_0, z^\downarrow_1, z^\downarrow_2)$ when $m^\uparrow = m^\downarrow - 1$.

The second sub-residue converting section 310 converts the first inter-moduli value of difference $(z^\downarrow_0, z^\downarrow_1, z^\downarrow_2)$ represented by the plurality of residues obtained with respect to each one of the plurality of second sub-moduli $\{m^\downarrow_0, m^\downarrow_1, m^\downarrow_2\}$ into a converted inter-module value of difference represented by the plurality of residues obtained with respect to each one of the plurality of first sub-moduli $\{m^\uparrow_0, m^\uparrow_1, m^\uparrow_2, m^\uparrow_3\}$.

The quotient outputting section 370 does not have the value-of-difference adjusting section 360 and outputs the residues $(z^\downarrow_0, z^\downarrow_1, z^\downarrow_2)$ of the quotient q, i.e., the scaling result Z, obtained with respect to the second modulus represented by the plurality of residues obtained with respect to each one of the plurality of sub-moduli based on the quotient outputting section-corresponding-to-first modulus 372 that output the residues $(z^\uparrow_0, z^\uparrow_1, z^\uparrow_2, z^\uparrow_3)$ of the quotient q, i.e., the scaling result Z, obtained with respect to the first modulus, represented by the plurality of residues obtained with respect to each one of the plurality of first sub-moduli $\{m^\uparrow_0, m^\uparrow_1, m^\uparrow_2, m^\uparrow_3\}$ based on the converted inter-moduli values of difference and based on the first inter-moduli values of difference.

Figure 9:
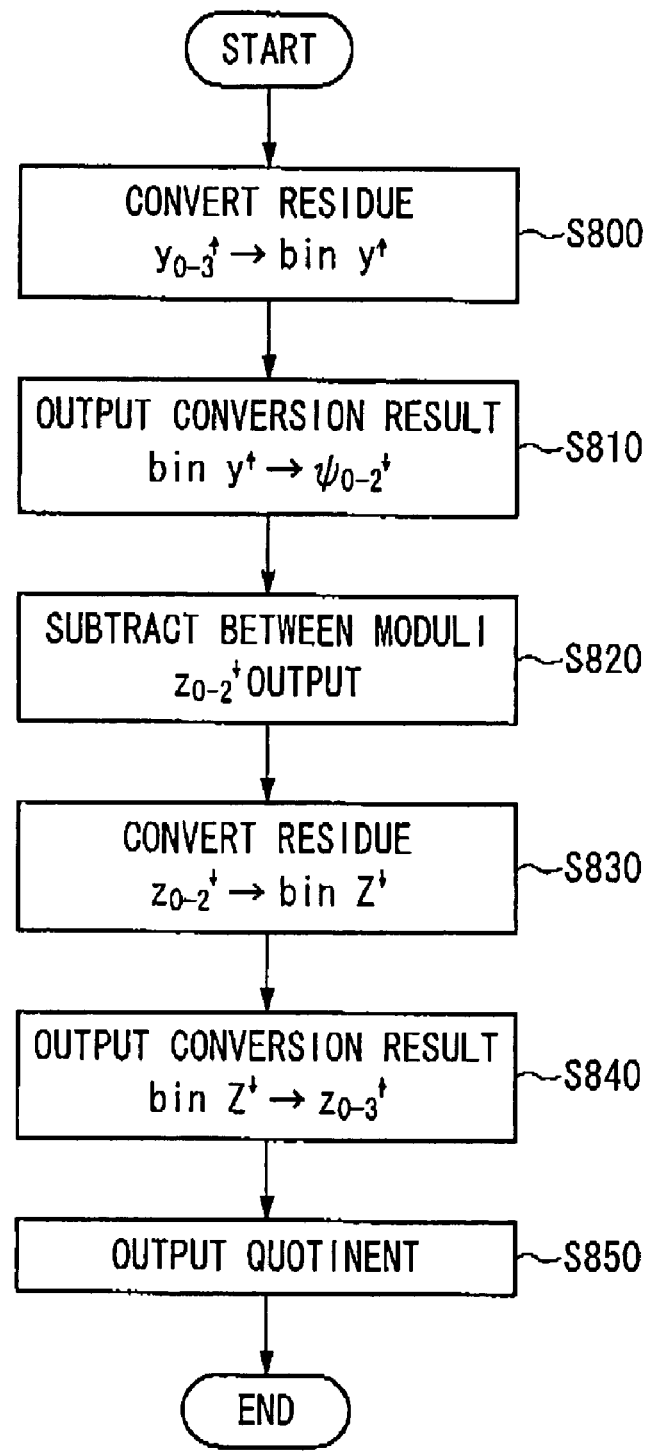
FIG. 9 shows an operation flow of the scaling operator according to the second modification of the embodiment of the invention.

FIG. 9 shows an operation flow of the scaling operator 100 according to the second modification of the embodiment of the invention.

Receiving the input number Y which is the number-under-scaling in the arithmetic residue format, the residue converter 302 within the first sub-residue converting section 300 converts the residue $y^\uparrow$ of the input number Y obtained with respect to the first modulus $m^\uparrow$ represented by the plurality of sub-residues $(y^\uparrow_0, y^\uparrow_1, y^\uparrow_2, y^\uparrow_3)$ into the binary $y^\uparrow$ in Step S800. Next the conversion result outputting section 304 converts the binary $y^\uparrow$ into a plurality of first converted sub-residues $(\psi^\downarrow_0, \psi^\downarrow_1, \Psi^\downarrow_2)$ in Step S810.

Then, the subtracter 320 outputs the first inter-moduli values of difference outputted by the subtracter-corresponding-to-second modulus 340 as the inter-moduli value of difference which is a value of difference between the residue $y^\uparrow$ obtained with respect to the first modulus $m^\uparrow$ and the residue $y^\downarrow$ obtained with respect to the second modulus $m^\downarrow$ in the input number Y in Step S820.

Next the second sub-residue converting section 310 converts the first inter-moduli values of difference represented by the plurality of residues obtained with respect to each one of the plurality of second sub-moduli $\{m^\downarrow_0, m^\downarrow_1, m^\downarrow_2\}$ into the converted inter-moduli values of difference represented by the plurality of residues obtained with respect to the plurality of first sub-moduli $\{m^\uparrow_0, m^\uparrow_1, m^\uparrow_2, m^\uparrow_3\}$ in Step S830.

Next, the quotient outputting section 370 outputs the set of residues $(z^\uparrow_0, z^\uparrow_1, z^\uparrow_2, z^\uparrow_3)$ of the quotient q, i.e., the scaling result Z, obtained with respect to the first modulus and residues $(z^\downarrow_0, z^\downarrow_1, z^\downarrow_2)$ obtained with respect to the second modulus based on the converted inter-moduli values of difference in Step S850.

As described above, the scaling operator 100 of the second modification calculates the inter-moduli values of difference by converting part of the plurality of residues in the arithmetic RNS into the representation in the other plurality of residue digits. It allows the overhead of the conversion process to be reduced as compared to the case of converting the RNS between the scaling RNS and the arithmetic RNS. Still more, it allows each residue digit of the scaling result Z to be generated by using one inter-moduli values of difference calculated by the subtracter 320, allowing the volume of hardware to be reduced.

Figure 10:
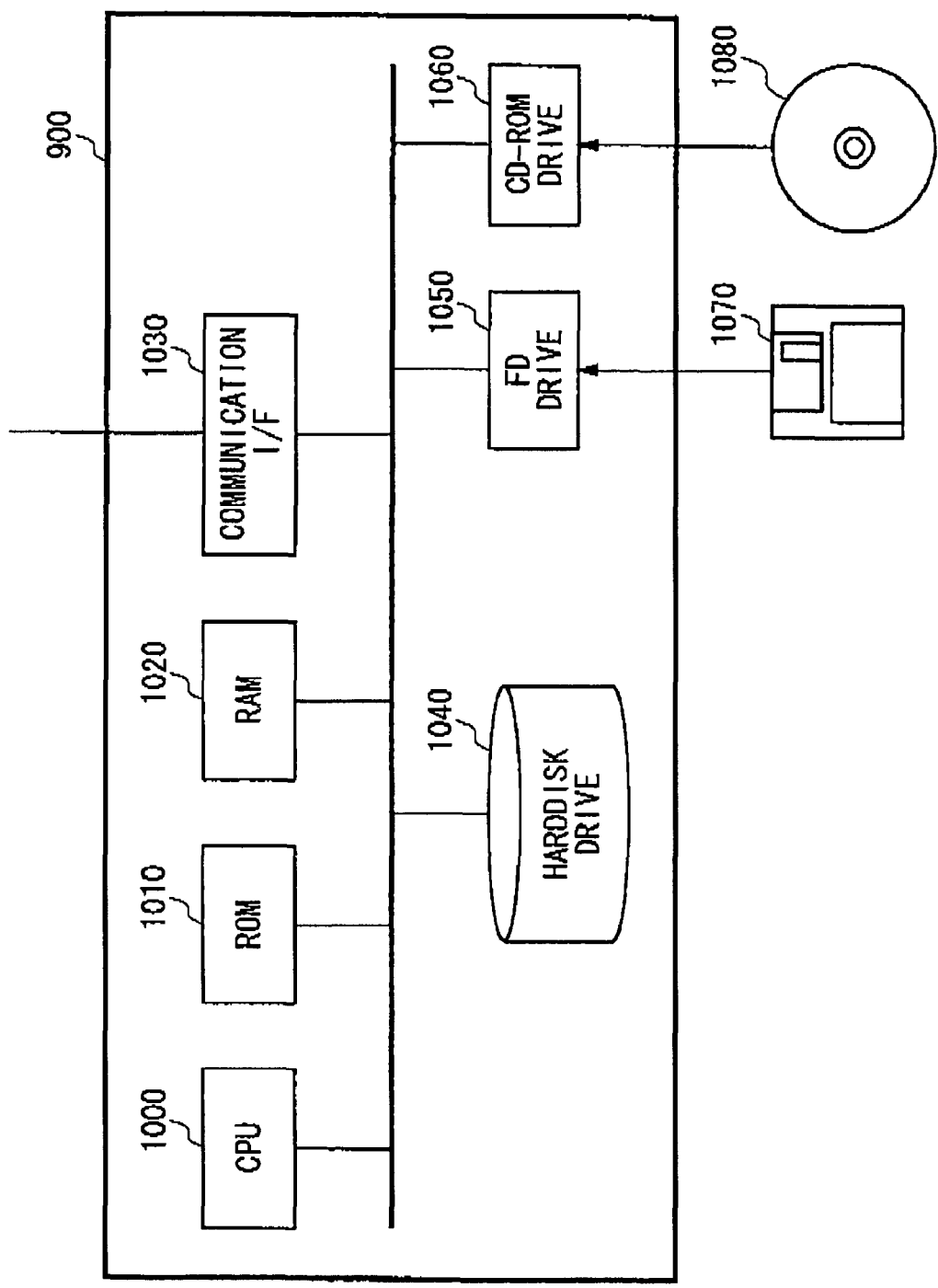
FIG. 10 shows one example of a hardware configuration of a computer according to the embodiment of the invention.

FIG. 10 shows one example of a hardware configuration of a computer 900 according to the embodiment of the invention. The computer 900 of the present embodiment has a CPU 1000, a ROM 1010, a RAM 1020, a communication interface 1030, a hard disk drive 1040, a flexible disk drive 1050 and a CD-ROM drive 1060.

The CPU 1000 operates based on programs stored in the ROM 1010 and the RAM 1020 and controls each section. The ROM 1010 stores a boot program executed by the CPU 1000 in starting the computer 900, programs dependent on the hardware of the computer 900 and the like. The RAM 1020 stores the programs executed by the CPU 1000, data used by the CPU 1000 and the like. The communication interface 1030 communicates with other devices via a communication network. The hard disk drive 1040 stores the programs and data used by the computer 900 and feeds them to the CPU 1000 via the RAM 1020. The flexible disk drive 1050 reads the programs or data out of a flexible disk 1070 and feeds it to the RAM 1020. The CD-ROM drive 1060 reads the program or data out of a CD-ROM 1080 and feeds it to the RAM 1020.

The programs fed to the CPU 1000 via the RAM 1020 are stored in a recording medium such as the flexible disk 1070, the CD-ROM 1080 and an IC card and are provided to users. The program is read out of the recording medium and is installed in the computer 900 via the RAM 1020 to be executed.

The program installed in and executed by the computer 900 so as to operate the computer 900 as the RNS arithmetic operating system $ has an RNS operating module, an overflow detecting module, a residue format converting module, a subtracting module, a quotient outputting module and a scaling operation module having a residue format inverse conversion module. The CPU 1000 and/or the RAM 1020 within the computer 900 operates these program or module as the scaling operator 100 having the RNS arithmetic operator 10, the overflow detector 110, the residue format converter 120, the subtracter 130, the quotient outputting section 140 and the residue format inverse converter 150.

Instead of that, the scaling operation module may have a first sub-residue converting module having a residue converting module and a conversion result outputting module, a second sub-residue converting module having a residue converting module and a conversion result outputting module, a subtracting module having subtracting modules corresponding to first and second moduli, a condition judging module, a value-of-difference adjusting module, a quotient outputting module corresponding to first modulus and a quotient outputting module having a quotient outputting module corresponding to second modulus. The CPU 1000 and/or the RAM 1020 within the computer 900 operates these program or module as the first sub-residue converting section 300 having the residue converter 302 and the conversion result outputting section 304, the second sub-residue converting section 310 having the residue converter 312 and the conversion result outputting section 314, the subtracter 320 having the subtracter-corresponding-to-first modulus 330 and the subtracter-corresponding-to-second modulus 340, the condition judging section 350, the value-of-difference adjusting section 360, the quotient outputting section-corresponding-to-first modulus 372 and the quotient outputting section 370 having the quotient outputting section-corresponding-to-second modulus 374, respectively.

The scaling operation module may also have a first sub-residue converting module having a residue converting module and a conversion result outputting module, a second sub-residue converting module having a residue converting module and a conversion result outputting module, a subtracting module having a subtracting module corresponding to second modulus and a quotient outputting module having a quotient outputting module corresponding to first modulus and a quotient outputting module corresponding to second modulus. The CPU 1000 and/or the RAM 1020 within the computer 900 operates these program or module as the first sub-residue converting section 300 having the residue converter 302 and the conversion result outputting section 304, the second sub-residue converting section 310 having the residue converter 312 and the conversion result outputting section 314, the subtracter 320 having the subtracter-corresponding-to-second modulus 340 and the quotient outputting section 370, respectively.

The program or module described above may be stored in an external recording medium. As the recording medium, an optical recording medium such as DVD and PD, a magneto-optic recording medium such as MD, a taped medium, a semiconductor memory such as IC card and the like may be used beside the flexible disk 1070 and the CD-ROM 1080. Still more, a storage device such as hard disk or RAM provided in a server system connected with a private communication network or with Internet may be used as a recording medium to provide the program to the computer 900 from the outside network via the communication network.

An arithmetic complexity of the scaling operation carried out by the scaling operator 100 described above will now be compared with the conventional method.

In scaling a number in the arithmetic RNS represented by seven moduli of {25, 8, 7, 3, 19, 17, 13} for example, multiplication of 24 bits of binary number has to be carried out by seven times when the Chinese remainder theorem shown in Equation (1-17) is used. However, the scaling operator 100 shown in FIG. 2 can realize the same scaling by carrying out multiplication of 12 bits by seven times. Here, an arithmetic complexity of sum-of-products operation is proportional to a square of a number of bits. In scaling the number that becomes n bits in binary number as described above, while the arithmetic complexity of the conventional method is $n^2C$, the arithmetic complexity of the scaling operator 100 shown in FIG. 2 is $(n/2)^2C$, where C is an arithmetic complexity of one bit adder. Accordingly, the scaling operator 100 shown in FIG. 2 can reduce the arithmetic complexity to a quarter as compared to the conventional method.

Still more, the scaling operator 100 shown in FIG. 4 carries out residue additions and subtractions of each residue digit (2 to 5 bits) of binary number just 9 to 12 times if the conversion factor calculating sections 410b through 410d within the residue converter 302 are constructed by a look-up table. Thus, the arithmetic complexity of the scaling operator 100 becomes about $(n+(\frac{1}{2})n)C$, though it depends on the selection of modulus, and the sealing operator 100 can reduce the arithmetic complexity to about $(\frac{1}{24})n$ as compared to the conventional method.

Although the invention has been described by way of the exemplary embodiments, it should be understood that those skilled in the art might make many changes and substitutions without departing from the spirit and scope of the invention.

It is obvious from the definition of the appended claims that the embodiments with such modifications also belong to the scope of the invention.

Complementary Explanation on matters that become presuppositions for realizing the RNS arithmetic operating system 5 will now be made.
(Complementary Explanation 1)
Explanation on Scaling Method by Scaling RNS The scaling method by the scaling RNS (SDSRNS Method) will be explained below by separating to each case when $m^↓=m^↑-1$ and when $m^↓\neq m^↑-1$.

(1) In Case of $m^{\downarrow}=m^{\uparrow}-1$

In a scaling RNS having two moduli of $\{m^{\uparrow}, m^{\downarrow}\}$, a scaling result obtained by scaling Y by $m^{\downarrow}$ is given in a form of (q mod $m^{\uparrow}$, q mod $m^{\downarrow}$) by using a quotient q obtained by dividing Y by $m^{\downarrow}$. Here, $m^{\uparrow}$ and $m^{\downarrow}$ are relatively prime and a relationship of the following Equation (3-1) is supposed to exist between $m^{\uparrow}$ and $m^{\downarrow}$.

$$m^{\downarrow}=m^{\uparrow}-1 \quad (3\text{-}1)$$

In this case, a maximum number representable by the scaling RNS is $M=m^{\uparrow}m^{\downarrow}=m^{\uparrow}(m^{\uparrow}-1)$.

A method for calculating a result q obtained by scaling the number-under-scaling Y by the modulus $m^{\downarrow}$ will be explained below. It is noted that the scaling result p obtained by scaling the number-under-scaling Y by the modulus $m^{\uparrow}$ may be calculated in the same manner, so that explanation thereof will be omitted here.

The number-under-scaling Y may be represented by a first residue format $(y^{\uparrow}, y^{\downarrow})$ of a set of residue $y^{\uparrow}$ obtained with respect to the first modulus $m^{\uparrow}$ and residue $y^{\downarrow}$ obtained with respect to the second modulus $m^{\downarrow}$. Here, the following Equations (3-2) and (3-3) hold from Equation (1-2). Where, $y^{\uparrow}$ is a residue obtained by dividing Y by $m^{\uparrow}$, $y^{\downarrow}$ is a residue obtained by dividing Y by $m^{\downarrow}$, p is a quotient by dividing Y by $m^{\uparrow}$ ($p=Y/m^{\uparrow}$) and q is a quotient obtained by dividing Y by $m^{\downarrow}$ ($q=Y/m^{\downarrow}$).

$$Y=pm^{\uparrow}+y^{\uparrow} \quad (3\text{-}2)$$

$$Y=qm^{\downarrow}+y^{\downarrow} \quad (3\text{-}3)$$

It can be understood that the following Equation (3-4) may be obtained and that Equation (3-5) holds by substituting Equation (3-1) into Equation (3-3) and by subtracting it from Equation (3-2).

$$y^{\downarrow} - y^{\uparrow} = pm^{\uparrow} - q(m^{\uparrow} - 1) \quad (3\text{-}4)$$
$$= (p-q)m^{\uparrow} + q \equiv q \bmod m^{\uparrow}$$

$$(y^{\downarrow} - y^{\uparrow}) \bmod m^{\uparrow} = q\left(=\frac{Y}{m^{\downarrow}}\right) \quad (3\text{-}5)$$

The result q obtained by scaling Y by the modulus $m^{\downarrow}$ may be obtained by calculating the difference of two residue numbers $(y^{\downarrow}-y^{\uparrow})$ from equation (3-5). In the same manner, binary representation of the result p obtained by scaling Y by the modulus $m^{\uparrow}$ may be obtained from the following Equation (3-6).

$$(y^{\downarrow} - y^{\uparrow}) \bmod m^{\downarrow} = p\left(=\frac{Y}{m^{\uparrow}}\right) \quad (3\text{-}6)$$

Next the scaling result q in the notation of binary number will be converted into the notation of scaling RNS. When the modulus is a sufficiently large number, the use of approximation of the following Equation (3-7) may lead to Equation (3-8).

$$M=m^{\uparrow}m^{\downarrow}=m^{\uparrow}(m^{\uparrow}-1)\approx(m^{\uparrow})^2 \quad (3\text{-}7)$$

$$0 \leq q < M/m^{\uparrow} = m^{\downarrow}(=m^{\uparrow}) \quad (3\text{-}8)$$

That is, the calculation result q which can be found from the difference between the residue digits may be approximated when it is always smaller tan the modulus $m^{\uparrow}(m^{\downarrow})$ and the following Equation (3-9) holds.

$$q \bmod m^{\uparrow} = q \bmod m^{\downarrow} = q \quad (3\text{-}9)$$

Then, the result obtained by scaling Y by the modulus $m^{\downarrow}$ is given from the following Equation (3-10).

$$q = (q \bmod m^{\uparrow}, q \bmod m^{\downarrow}) \quad (3\text{-}10)$$
$$= ((y^{\downarrow}-y^{\uparrow}) \bmod m^{\uparrow}, (y^{\downarrow}-y^{\uparrow}) \bmod m^{\uparrow})$$

However, Equation (3-7) described above does not hold when $q=m^{\downarrow}$. Then, it may be realized by using either method of limiting an upper limit of the number-under-scaling Y to $Y<m^{\uparrow}\times m^{\downarrow}$, of scaling by $m^{\uparrow}$ or of converting q mod $m^{\downarrow}=0$ when q mod $m^{\uparrow}=m^{\downarrow}$.

(2) In Case of $m^{\uparrow}\neq m^{\downarrow}-1$

When $m^{\uparrow}\neq m^{\downarrow}-1$ and $m^{\uparrow}>m^{\downarrow}$, the following Equation (3-11) may be led from Equations (3-2) and (3-3).

$$y^{\downarrow} - y^{\uparrow} = pm^{\uparrow} - qm^{\downarrow} \quad (3\text{-}11)$$
$$= pm^{\uparrow} - q(m^{\uparrow} - (m^{\uparrow} - m^{\downarrow}))$$
$$= (p-q)m^{\uparrow} + q(m^{\uparrow} - m^{\downarrow})$$
$$= q(m^{\uparrow} - m^{\downarrow}) \bmod m^{\uparrow}$$

When a restriction is placed so that $q\cdot(m^{\uparrow}-m^{\downarrow})<m^{\uparrow}$ here, the following Equation (3-12) holds. It is noted that from this restriction, a maximum value M of Y is limited to be less than $(m^{\uparrow}\times m^{\downarrow})/(m^{\uparrow}-m^{\downarrow})$.

$$q = \frac{(y^{\downarrow}-y^{\uparrow}) \bmod m^{\uparrow}}{(m^{\uparrow}-m^{\downarrow})} \quad (3\text{-}12)$$

Then, the result obtained by scaling Y by the modulus $m^{\downarrow}$ is given from the following Equation (3-12) from Equation (3-6) in the same manner with Equation (3-10).

$$q = \left(\frac{(y^{\downarrow}-y^{\uparrow}) \bmod m^{\uparrow}}{(m^{\uparrow}-m^{\downarrow})}, \frac{(y^{\downarrow}-y^{\uparrow}) \bmod m^{\uparrow}}{(m^{\uparrow}-m^{\downarrow})}\right) \quad (3\text{-}13)$$

When $m^{\uparrow}\neq m^{\downarrow}-1$ and $m^{\uparrow}<m^{\downarrow}$, the following Equation (3-14) may be led from Equations (3-2) and (3-3).

$$y^{\uparrow} - y^{\downarrow} = qm^{\downarrow} - pm^{\uparrow} \quad (3\text{-}14)$$
$$= q(m^{\uparrow} + (m^{\downarrow} - m^{\uparrow})) - pm^{\uparrow}$$
$$= (q-p)m^{\uparrow} + q(m^{\downarrow} - m^{\uparrow})$$
$$= q(m^{\downarrow} - m^{\uparrow}) \bmod m^{\uparrow}$$

When a restriction is placed so that $q\cdot(m^{\downarrow}-m^{\uparrow})<m^{\downarrow}$, the following Equation (3-15) holds. It is noted that from this restriction, a maximum value M of Y is limited to be less than $(m^{\uparrow}\times m^{\downarrow})(m^{\downarrow}-m^{\uparrow})$.

$$q = \frac{(y^{\uparrow}-y^{\downarrow}) \bmod m^{\uparrow}}{(m^{\downarrow}-m^{\uparrow})} \quad (3\text{-}15)$$

Then, the result obtained by scaling Y by the modulus $m^{\downarrow}$ is given from the following Equation (3-16).

$$q = \left(\frac{(y^\uparrow - y^\downarrow)\bmod m^\uparrow}{(m^\downarrow - m^\uparrow)}, \frac{(y^\uparrow - y^\downarrow)\bmod m^\uparrow}{(m^\uparrow - m^\downarrow)}\right) \quad (3\text{-}16)$$

(Complementary Explanation 2)
Method for Calculating Scaling Result by Adjustment of Value of Difference An explanation will be made on a method for calculating $z^\uparrow$ in the scaling result Z by using an inter-module value of difference obtained by converting the number-under-scaling $y^\downarrow$ represented by a plurality of second sub-residues ($y^\downarrow_0, y^\downarrow_1, y^\downarrow_2$) into a scaling factor $\psi^\uparrow$ represented by a plurality of second converted sub-residues $\{\psi^\uparrow_0, \psi^\uparrow_1, \psi^\uparrow_2, \psi^\uparrow_3\}$. The scaling RNS will be used below for the convenience of explanation.

At first, in order to derive a scaling result (denoted as zLOz$^\uparrow$ hereinafter) of $z^\uparrow$ with respect to $m^\downarrow$ from a scaling result (denoted as zUP$^\uparrow$) of $z^\uparrow$ with respect to $m^\uparrow$, the relationship between zUP$^\uparrow$ and zLO$^\uparrow$ will be shown. Here, the following auxiliary theorem holds between zUP$^\uparrow$ and zLO$^\uparrow$.

Auxiliary Theorem: When $m^\downarrow = m^\uparrow - 1$, zUP$^\uparrow$ and zLO$^\uparrow$ satisfies zLO$^\uparrow$=zUP$^\uparrow$ or zLO$^\uparrow$=zUP$^\uparrow$+1.

Proof: Suppose that zLO$^\uparrow$=zUP$^\uparrow$+J, where J is an integer.
zLO$^\uparrow$ is a result obtained by scaling Y by $m^\downarrow$ and zUP$^\uparrow$ is a result obtained by scaling Y by $m^\uparrow$. From Equation (1-2), the following Equations (4-1) and (4-2) may be obtained by using a scaling RNS ($y^\uparrow, y^\downarrow$).

$$y = zLO^\uparrow \cdot m^\downarrow + y^\downarrow \quad (4\text{-}1)$$

$$y = zUP^\uparrow \cdot m^\uparrow + y^\uparrow \quad (4\text{-}2)$$

Equation (4-1) may be reduced to the following Equation (4-3) by using $m^\downarrow = m^\uparrow - 1$.

$$Y = (zUP^\uparrow + J)m^\downarrow + y^\downarrow \quad (4\text{-}3)$$
$$= zUP^\uparrow \cdot m^\uparrow - zUP^\uparrow + J \cdot m^\downarrow + y^\downarrow$$

The following Equation (4-4) holds from Equations (4-2) and (4-3).

$$y^\downarrow - y^\uparrow = zUP^\uparrow - J \cdot m^\downarrow \quad (4\text{-}4)$$

Because $y^\uparrow$ is a residue of the first modulus $m^\uparrow$ here, it satisfies $0 \leq y^\uparrow < m^\uparrow$. Still more, because $y^\downarrow$ is a residue of the second modulus $m^\downarrow$, it satisfies $0 \leq y^\downarrow < m^\downarrow$. Accordingly, the following Equation (4-5) holds, $$0 \leq |y^\downarrow - y^\uparrow| \leq m^\uparrow \quad (4\text{-}5)$$

Further, because zUP$^\uparrow$ is the result obtained by scaling Y by $m^\uparrow$, the following Equation (4-6) holds when Equation (3-8) is applied.

$$0 \leq zUP^\uparrow < m^\downarrow \quad (4\text{-}6)$$

If Equation (4-4) is supposed that $J \geq 2$, $y^\uparrow$ is 0 which is a least value possible and zUP$^\uparrow$ is $(m^\downarrow - 1)$ which is a maximum value possible, it becomes the following Equation (4-7), which is contradictory to $0 \leq y^\uparrow < m^\uparrow$.

$$y^\downarrow = zUP^\uparrow - J \cdot m^\downarrow + 0 \quad (4\text{-}7)$$
$$= (m^\downarrow - 1) - J \cdot m^\downarrow + 0$$
$$= (1 - J)m^\downarrow - 1 + 0 < 0$$

Still more, it becomes $y^\downarrow = (1-J)m^\downarrow - 1 + y^\uparrow > m^\downarrow$ and becomes contradictory to $0 \leq y^\downarrow < m^\uparrow$ also when it is supposed that J<0. Accordingly, a possible value of J is 0 or 1. That is, it becomes that zLO$^\uparrow$=zUP$^\uparrow$ or zLO$^\uparrow$=zUP$^\uparrow$+1.

The use of the auxiliary theorem described above allows the scaling result $z^\uparrow$ (=zLO$^\uparrow$) to be calculated from zUP$^\uparrow$. A method for judging if zLO$^\uparrow$ is either zUP$^\uparrow$ or zUP$^\uparrow$+1 by using binary $y^\uparrow$(bin $y^\uparrow$) and $y^\downarrow$(bin $y^\downarrow$).

From Equation (4-4), $y^\downarrow - y^\uparrow = zUP^\uparrow \geq 0$ when J=0 and $y^\downarrow - y^\uparrow = zUP^\uparrow - m^\downarrow < 0$ when J=1. Therefore, the following Equations (4-8) and (4-9) hold.

$$y^\downarrow \geq y^\uparrow \text{ のとき } zLO^\uparrow = zUP^\uparrow \quad (4\text{-}8)$$

$$y^\downarrow < y^\uparrow \text{ のとき } zLO^\uparrow = zUP^\uparrow + 1 \quad (4\text{-}9)$$

Accordingly, it will do by outputting zUP$^\uparrow$ when bin $y^\downarrow \geq y^\uparrow$ and by outputting zUP$^\uparrow$+1 when bin $y^\downarrow$<bin $y^\uparrow$ as the scaling result $z^\uparrow$.

INDUSTRIAL APPLICABILITY

As it is apparent from the above description, the invention can provide the RNS arithmetic operating system capable of realizing the increase of speed of both of the arithmetic operations of additions, subtractions and multiplications in the RNS and of the scaling operation.

What is claimed is:

1. A scaling operator for calculating a quotient in a first residue format obtained by dividing an input number in said first residue format by a second modulus in a residue number system for representing numbers by said first residue format of a set of residues obtained with respect to first modulus and residues obtained with respect to second modulus, comprising: a subtracter for outputting inter-moduli values of difference which are values of difference between the residues obtained with respect to said first modulus and the residues obtained with respect to said second modulus; and a quotient outputting section for outputting a set of residues of said quotient obtained with respect to said first modulus and residues of said quotient obtained with respect to the said second modulus as said quotient based on said inter-moduli values of difference.

2. The scaling operator as set forth in claim 1, wherein said first modulus and said second modulus are relatively prime.

3. The scaling operator as set forth in claim 2, wherein said a difference between said first modulus and said second modulus is 1, and said quotient outputting section outputs residues of said inter-moduli value of difference obtained with respect to said first modulus as residues of said quotient obtained with respect to said first modulus and residues of said quotient obtained with respect to said second modulus.

4. The scaling operator as set forth in claim 1, wherein said subtracter outputs said inter-moduli values of difference obtained by subtracting a residue obtained with respect to a larger modulus from a residue obtained with respect to a smaller modulus among said first and second modulus in said input number in said residue format; and said quotient outputting section calculates a residue, obtained with respect to said first modulus, of a value obtained by dividing said inter-moduli values of difference by an absolute value of difference between said first modulus and said second modulus as a residue of said quotient obtained with respect to said first modulus and a residue of said quotient obtained with respect to said second modulus.

5. The scaling operator as set forth in claim 1, wherein said first modulus is a product of a plurality of first sub-moduli which are plural integers relatively prime; and said second modulus is a product of a plurality of second sub-moduli which are plural integers relatively prime; and said scaling operator further includes a residue format converter for converting said input number in a second residue format in which residues of said input number obtained with respect to said first modulus are represented by a plurality of first sub-residues obtained by dividing said input number by each one of said plurality of first sub-moduli and residues of said input number obtained with respect to said second modulus are represented by a plurality of second sub-residues obtained by dividing said input number by each one of said plurality of second sub-moduli into said input number in said first residue format; and a residue format inverse converter for converting said quotient in said first residue format outputted out of said quotient outputting section into said quotient in said second residue format.

6. The scaling operator as set forth in claim 1, wherein said first modulus is a product of a plurality of first sub-moduli which are plural integers relatively prime; said second modulus is a product of a plurality of second sub-moduli which are plural integers relatively prime; said input number is also represented in a second residue format in which the residues obtained with respect to said first modulus are represented by a plurality of first sub-residues obtained by dividing said input number by each one of said plurality of first sub-moduli and residues obtained with respect to said second modulus are represented by a plurality of second sub-residues obtained by dividing said input number by each one of said plurality of second sub-moduli; said scaling operator Her comprises a first sub-residue converting section for converting the residues of said input number obtained with respect to said first modulus and represented by said plurality of first sub-residues into a plurality of first converted sub-residues which are residues obtained with respect to each one of said plurality of second sub-moduli; said subtracter has a subtracter-corresponding-to-second modulus for outputting said first inter-moduli values of difference which are values of difference between said plurality of first converted sub-residues representing residues of said input number obtained with respect to said first modulus and said plurality of second sub-residues representing residues of said input number obtained with respect to said second modulus and represented by a plurality of residues obtained by dividing said values of difference by each one of said plurality of second sub-moduli; and said quotient outputting section has a quotient outputting section-corresponding-to-second modulus for outputting residues of said quotient obtained with respect to said second modulus and represented by a plurality of residues obtained with respect to each one of said plurality of second sub-moduli based on said first inter-moduli values of difference.

7. The scaling operator as set forth in claim 6, further comprising a second sub-residue converting section for converting the residues of said input number obtained with respect to said second modulus and represented by said plurality of second sub-residues into a plurality of second converted sub-residues which are residues obtained with respect to each one of said plurality of first sub-moduli; wherein said subtracter has a subtracter-corresponding-to-first modulus for outputting said second inter-moduli values of difference which are values of difference between said plurality of second converted sub-residues representing the residues of said input number obtained with respect to said second modulus and said plurality of first sub-residues representing the residues of said input number obtained with respect to said first modulus and represented by a plurality of residues obtained by dividing said values of difference by each one of said plurality of first sub-moduli; and said quotient outputting section has a quotient outputting section-corresponding-to-first modulus for outputting the residues of said quotient obtained with respect to said first modulus and represented by a plurality of residues obtained with respect to each one of said plurality of first sub-moduli based on said second inter-moduli values of difference.

8. The scaling operator as set forth in claim 7, further comprising a condition judging section for judging whether or not the residues of said input number obtained with respect to said first modulus and the residues of said input number obtained with respect to said second modulus satisfy a relationship of the order of their magnitudes in advance; wherein said quotient outputting section also has a value-of-difference adjusting section for feeding said first inter-moduli values of difference and second inter-moduli values of difference adjusted by adding a preset constant to one of said first inter-moduli values of difference and said second inter-moduli values of difference to said quotient outputting section-corresponding-to-first modulus and said quotient outputting section-corresponding-to-second modulus, respectively, when the residues of said input number obtained with respect to said first modulus and the residues of said input number obtained with respect to said second modulus satisfy said relationship of the order of their magnitudes in advance.

9. The scaling operator as set forth in claim 7, wherein said first sub-residue converting section has: a conversion factor calculating section for calculating a conversion factor that sequentially converts residue-under-conversions into 0 and keeps all of the other residue-under-conversions already converted into 0 at 0 when subtracted from said value-under-conversion for each of said residue-under-conversions obtained by dividing said value-under-conversion by each one of said plurality of residue-under-conversions in said value-under-conversion that has residues of said input number obtained with respect to said first modulus as its initial value and that is represented by said plurality of first sub-residues; a conversion factor adder for sequentially adding said conversion factor sequentially calculated by said conversion factor calculating section and represented by the residues obtained with respect to said first modulus; a value-under-conversion subtracter for sequentially subtracting said conversion factor sequentially calculated by said conversion factor calculating section and represented by the plurality of residues obtained with respect to each one of said plurality of first sub-moduli from said value-under-conversion; and a conversion result outputting section for outputting the plurality of residues obtained by adding the added value obtained by adding all of said conversion factors, by said conversion factor adder, calculated for all of said plurality of residue-under-conversions as said plurality of first converted sub-residues.

10. The scaling operator as set forth in claim 9, wherein said conversion factor calculating section has a memory for storing said conversion factor corresponding to the residue-under-conversion in an address corresponding to the residue-under-conversion for each of said plurality of residue-under-conversions.

11. The scaling operator as set forth in claim 1, wherein said first modulus is a product of a, plurality of first sub-moduli which are plural integers relatively prime; said second modulus is a product of a plurality of second sub-moduli which are plural integers relatively prime; said input number is also represented in a second residue format in which residues obtained with respect to said first modulus are represented by a plurality of first sub-residues obtained by dividing said input number by each one of said plurality of first sub-moduli and residues obtained with respect to said second modulus are represented by a plurality of second sub-residues obtained by dividing said input number by each one of said plurality of second sub-moduli; said scaling operator further comprises a first sub-residue converting section for converting residues of said input number obtained with respect to said first modulus and represented by said plurality of first sub-residues into a plurality of first converted sub residues which are residues obtained with respect to each one of said plurality of second sub-moduli; said subtracter has a subtracter-corresponding-to-second modulus for outputting said first inter-moduli values of difference which are values of difference between said plurality of first converted sub-residues representing residues of said input number obtained with respect to said first modulus and said plurality of second sub-residues representing residues of said input number obtained with respect to said second modulus and represented by a plurality of residues obtained by dividing said values of difference by each one of said plurality of second sub-moduli; and said scaling operator further comprises a second sub-residue converting section for converting said first inter-moduli values of difference represented by a plurality of residues obtained with respect to each one of said plurality of second sub-moduli into converted inter-moduli values of difference represented by a plurality of residues obtained with respect to each one of said plurality of first sub-moduli; and said quotient outputting section has a quotient outputting section-corresponding-to-first modulus for outputting residues of said quotient obtained with respect to said first modulus and represented by a plurality of residues obtained with respect to each one of said plurality of first sub-moduli based on said converted inter-moduli values of difference; and a quotient outputting section-corresponding-to-second modulus for outputting residues of said quotient obtained with respect to said second modulus and represented by a plurality of residues obtained with respect to each one of said plurality of second sub-moduli based on said first inter-moduli values of difference.

12. AN RNS arithmetic operating system using a residue number system representing numbers by a first residue format of a set of residues obtained with respect to a first modulus and residues obtained with respect to a second modulus, comprising: an RNS arithmetic operator that receives two numbers to be operated and carries out additions, subtractions or multiplications between the two numbers-under-operation; and a scaling operator for receiving the operation result of said RNS arithmetic operator as an input number when said operation result needs to be scaled and for calculating a quotient obtained by dividing said input number by said second modulus as a scaling result of said operation result, wherein said scaling operator has: a subtracter for outputting inter-moduli values of difference which are values of difference between residues obtained with respect to said first modulus and residues obtained with respect to said second modulus; and a quotient outputting section for outputting a set of residues of said quotient obtained with respect to said first modulus and residues of said quotient obtained with respect to said second modulus as said quotient based on said inter-moduli values of difference.

13. A scaling operation method performed by one or more processors for calculating a quotient in a first residue format obtained by dividing an input number in said first residue format by a second modulus in a residue number system for representing numbers by said first residue format of a set of residues obtained with respect to first and second moduli, comprising: a subtracting step of outputting, by the one or more processors, inter-moduli values of difference which are values of difference between the residues obtained with respect to said first modulus and the residues obtained with respect to said second modulus; and a quotient outputting step of outputting, by the one or more processors, a set of residues of said quotient obtained with respect to said first modulus and residues of said quotient obtained with respect to said second modulus as said quotient based on said inter-moduli values of difference.

14. The scaling operation method as set forth in claim 13, wherein said first modulus is a product of a plurality of first sub-moduli which are plural integers relatively prune; said second modulus is a product of a plurality of second sub-moduli that are plural integers relatively prime; said input number is also represented in a second residue format in which residues obtained with respect to said first modulus are represented by a plurality of first sub-residues obtained by dividing said input number by each one of said plurality of first sub-moduli and residues obtained with respect to said second modulus are represented by a plurality of second sub-residues obtained by dividing said input number by each one of said plurality of second sub-moduli; said scaling operation step further comprises a first sub-residue converting step of converting residues of said input number obtained with respect to said first modulus and represented by said plurality of first sub-residues into a plurality of first converted sub-residues which are residues obtained with respect to each one of said plurality of second sub-moduli; said subtracting step has a subtracting step corresponding to said second modulus of outputting said first inter-moduli values of difference which are values of difference between said plurality of first converted sub-residues representing residues of said input number obtained with respect to said first modulus and said plurality of second sub-residues representing residues of said input number obtained with respect to said second modulus and represented by a plurality of residues obtained by dividing said values of difference by each one of said plurality of second sub-moduli; and said quotient outputting step has a quotient outputting step corresponding to said second modulus of outputting residues of said quotient obtained with respect to said second modulus and represented by a plurality of residues obtained with respect to each one of said plurality of second sub-moduli based on said first inter-moduli values of difference.

15. A computer program product having computer instructions, recorded on a non-transitory computer readable medium, for enabling a computer executing the computer instructions to perform a scaling operation method for calculating a quotient in a first residue format obtained by dividing an input number in said first residue format by a second modulus in a residue number system for representing numbers by said first residue format of a set of residues obtained with respect to first and second moduli, the method comprising: a subtracting step of outputting inter-moduli values of difference which are values of difference between the residues obtained with respect to said first modulus and the residues obtained with respect to said second modulus; and a quotient outputting step of outputting a set of residues of said quotient obtained with respect to said first modulus and residues of said quotient obtained with respect to said second modulus as said quotient based on said inter-moduli values of difference.

16. The non-transitory computer readable medium on which are recorded the computer instructions of the computer program product of claim 15.

* * * * *